US010387900B2

(12) United States Patent
Bledsoe et al.

(10) Patent No.: US 10,387,900 B2
(45) Date of Patent: Aug. 20, 2019

(54) METHODS AND APPARATUS FOR SELF-ADAPTIVE TIME SERIES FORECASTING ENGINE

(71) Applicant: DataRobot, Inc., Boston, MA (US)

(72) Inventors: John Bledsoe, Columbus, OH (US); Jeff Gabriel, Westerville, OH (US); Jason Montgomery, Westerville, OH (US); Ryan Sevey, Westerville, OH (US); Matt Steinpreis, San Francisco, CA (US); Craig Vermeer, Lewis Center, OH (US); Ryan West, Columbus, OH (US)

(73) Assignee: DataRobot, Inc., Boston, MA (US)

( * ) Notice: Subject to any disclaimer, the term of this patent is extended or adjusted under 35 U.S.C. 154(b) by 0 days.

(21) Appl. No.: 15/488,771

(22) Filed: Apr. 17, 2017

(65) Prior Publication Data
US 2018/0300737 A1 Oct. 18, 2018

(51) Int. Cl.
*G06Q 30/02* (2012.01)
*G06Q 10/06* (2012.01)
(Continued)

(52) U.S. Cl.
CPC ....... *G06Q 30/0202* (2013.01); *G06F 16/248* (2019.01); *G06F 16/2428* (2019.01); *G06F 16/2477* (2019.01); *G06Q 10/06395* (2013.01)

(58) Field of Classification Search
CPC ......... G06Q 10/00; G06Q 40/06; G06F 17/60
(Continued)

(56) References Cited

U.S. PATENT DOCUMENTS 5,761,442 A * 6/1998 Barr ..................... G06N 3/0454
705/35
7,072,863 B1 * 7/2006 Phillips ................. G06Q 40/00
703/2
(Continued)

FOREIGN PATENT DOCUMENTS

JP   2005-135287 A   5/2005
WO  WO-2010044683 A1  4/2010

OTHER PUBLICATIONS

Ensemble Learning; https://en.wikipedia.org/wiki/Ensemble_learing; Creative Commons Attribution-ShareAlike License, Aug. 2, 2017; pp. 1-8.
(Continued)

*Primary Examiner* — Romain Jeanty
(74) *Attorney, Agent, or Firm* — Goodwin Procter LLP

(57) ABSTRACT

An apparatus has a memory with processor-executable instructions and a processor operatively coupled to the memory. The apparatus receives datasets including time series data points that are descriptive of a feature of a given entity. The processor determines a time series characteristic based on the data content, and selects, based on the determined characteristic, a set of entrant forecasting models from a pool of forecasting models stored in the memory. Next, the processor trains each entrant forecasting model with the time series data points to produce a set of trained entrant forecasting models. The processor executes each trained entrant forecasting model to generate a set of forecasted values indicating estimations of the feature of the given entity. Thereafter the processor selects at least one forecasting model from the set of trained entrant forecasting models based on computed accuracy evaluations performed over the set of forecasted values.

29 Claims, 11 Drawing Sheets

(51) Int. Cl.
  *G06F 16/248* (2019.01)
  *G06F 16/242* (2019.01)
  *G06F 16/2458* (2019.01)

(58) Field of Classification Search
  USPC .............................................. 705/7.29, 7.31
  See application file for complete search history.

(56) References Cited

U.S. PATENT DOCUMENTS

| | | | |
|---|---|---|---|
| 7,117,185 | B1 | 10/2006 | Aliferis et al. |
| 7,580,852 | B2* | 8/2009 | Ouimet ................... G06Q 10/04 |
| | | | 705/35 |
| 8,024,216 | B2* | 9/2011 | Aronowich ...... G06Q 10/06315 |
| | | | 705/7.31 |
| 8,180,664 | B2* | 5/2012 | Shan ....................... G06Q 10/04 |
| | | | 705/7.31 |
| 8,370,280 | B1 | 2/2013 | Lin et al. |
| 8,645,421 | B2* | 2/2014 | Meric ..................... G06Q 10/00 |
| | | | 705/7.29 |
| 8,682,709 | B2* | 3/2014 | Coldren ................. G06Q 10/06 |
| | | | 705/7.11 |
| 8,782,037 | B1 | 7/2014 | Barad et al. |
| 8,843,427 | B1 | 9/2014 | Lin et al. |
| 9,489,630 | B2 | 11/2016 | Achin et al. |
| 9,495,641 | B2 | 11/2016 | Schmidt |
| 9,524,473 | B2 | 12/2016 | Schmidt |
| 9,652,714 | B2 | 5/2017 | Achin et al. |
| 9,659,254 | B2 | 5/2017 | Achin et al. |
| 10,102,483 | B2 | 10/2018 | Schmidt |
| 2002/0144178 | A1 | 10/2002 | Castelli et al. |
| 2004/0030777 | A1 | 2/2004 | Reedy et al. |
| 2004/0054997 | A1 | 3/2004 | Katragadda et al. |
| 2005/0183073 | A1 | 8/2005 | Reynolds |
| 2005/0234762 | A1 | 10/2005 | Pinto et al. |
| 2006/0101014 | A1 | 5/2006 | Forman et al. |
| 2006/0190285 | A1 | 8/2006 | Harris et al. |
| 2007/0133848 | A1 | 6/2007 | McNutt et al. |
| 2008/0059284 | A1* | 3/2008 | Solotorevsky ......... G06Q 10/04 |
| | | | 705/7.38 |
| 2008/0097802 | A1* | 4/2008 | Ladde .................... G06Q 10/06 |
| | | | 705/7.11 |
| 2008/0307399 | A1 | 12/2008 | Zhou et al. |
| 2010/0131314 | A1 | 5/2010 | Lo Yuk Ting et al. |
| 2010/0312718 | A1 | 12/2010 | Rosenthal et al. |
| 2011/0119100 | A1* | 5/2011 | Ruhl .................... G06F 17/3089 |
| | | | 705/7.11 |
| 2012/0078678 | A1* | 3/2012 | Pradhan ................. G06Q 10/06 |
| | | | 705/7.27 |
| 2012/0144325 | A1 | 6/2012 | Mital et al. |
| 2012/0192051 | A1 | 7/2012 | Rothschiller et al. |
| 2012/0202240 | A1 | 8/2012 | Deigner et al. |
| 2013/0073061 | A1 | 3/2013 | Mu et al. |
| 2013/0096892 | A1 | 4/2013 | Essa et al. |
| 2013/0290226 | A1 | 10/2013 | Dokken |
| 2014/0074829 | A1 | 3/2014 | Schmidt |
| 2014/0136452 | A1 | 5/2014 | Wellman et al. |
| 2014/0172773 | A1 | 6/2014 | Schmidt |
| 2014/0258189 | A1 | 9/2014 | Schmidt |
| 2014/0372172 | A1* | 12/2014 | Fr as Mart nez .. G06Q 30/0202 |
| | | | 705/7.31 |
| 2015/0088606 | A1* | 3/2015 | Tyagi .................. G06O 30/0202 |
| | | | 705/7.31 |
| 2015/0317589 | A1* | 11/2015 | Anderson .............. G06Q 10/08 |
| | | | 705/7.25 |
| 2015/0339572 | A1 | 11/2015 | Achin et al. |
| 2015/0356576 | A1* | 12/2015 | Malaviya ........... G06Q 30/0202 |
| | | | 705/7.31 |
| 2016/0005055 | A1* | 1/2016 | Sarferaz ............. G06Q 30/0202 |
| | | | 705/7.31 |
| 2016/0048766 | A1 | 2/2016 | McMahon et al. |
| 2016/0335550 | A1 | 11/2016 | Achin et al. |
| 2016/0364647 | A1 | 12/2016 | Achin et al. |
| 2016/0379244 | A1* | 12/2016 | Kalish ................ G06Q 30/0242 |
| | | | 705/14.41 |
| 2017/0193398 | A1 | 7/2017 | Schmidt |
| 2017/0243140 | A1 | 8/2017 | Achin et al. |
| 2018/0046926 | A1 | 2/2018 | Achin et al. |
| 2018/0060738 | A1 | 3/2018 | Achin et al. |
| 2018/0060744 | A1 | 3/2018 | Achin et al. |

OTHER PUBLICATIONS

Information Criterion; https://en.wikipedia.org/w/index.php?title=Information_criterion&oldid=793390961; Creative Commons Attribution-ShareAlike License; Aug. 1, 2017.
A. Lorbert et al., Descent Methods for Tuning Parameter Refinement, Proceedings of the 13th International Conference on Artificial Intelligence and Statistics (AISTATS), 2010, pp. 469-476.
A. Rudi et al., Adaptive Optimization for Cross Validation, Proceedings of the European Symposium on Artificial Neural Networks, Computational Intelligence, and Machine Learning, 2012, pp. 435-440.
B. Boukhatem et al., Predicting concrete properties using neural networks (NN) with principal component analysis (PCA) technique, Computers and Concrete, vol. 10, No. 6, 2012, pp. 1-17.
B. Flyvbjerg et al., What Causes Cost Overruns in Transport Infrastructure Projects?, Transport Reviews, vol. 24, 2004, pp. 1-40.
B.K. Behera et al., Aabric Quality Evaluation by Objective Measurement, Indian Journal of Fibre and Textile Research, vol. 19, 1994, pp. 168-171.
Barresse, Microsoft Excel 2013- Flash Fill. Microsoft Excel and Access Experts Blog. Jul. 28, 2012. retrieved from https://excelandaccess.wordpress.com/2012/07/28/excel-2013-flash-fill/ [Mar. 3, 2016 1:45:25PM]. 5 pages.
C. Bordat et al., An Analysis of Cost Overruns and Time Delays of INDOT Projects, Final Report, FHWA/IN/JTRP-2004/7, Joint Transportation Research Program, Purdue University, 2004, 191 pages.
Ekart et al. 2000. A Metric for Genetic Programs and Fitness Sharing. Genetic Programming. Springer Berlin Heidelberg. EuroGP 2000, LNCS 1802. 2000. 259-70.
F. Xiao et al., Prediction of Fatigue Life of Rubberized Asphalt Concrete Mixtures Containing Reclaimed Asphalt Pavement Using Artificial Neural Networks, Journal of Materials in Civil Engineering, 2007, 41 pages.
G. Biau et al., COBRA: A Nonlinear Aggregation Strategy, Cornell University Library, Nov. 2013, 40 pages.
G. Bortolin et al., On modeling of curl in multi-ply paperboard, Journal of Process Control, vol. 16, 2006, pp. 419-429.
G. Bortolin, On Modeling and Estimation of Curl and Twist in Multi-ply Paperboard, Licentiate Thesis, Optimization and Systems Theory, Department of Mathematics, Royal Institute of Technology, Stockholm, Sweden, 2002, 106 pages.
Google Cloud Platform—Smart Autofill Spreadsheets Add on—Predication API. Apr. 23, 2015. retrieved from https://cloud.google.com/prediction/docs/smart_autofill_add_on. [Aug. 23, 2015], 9 pages.
I.M. Alsmadi et al., Evaluation of Cost Estimation Metrics: Towards a Unified Terminology, Journal of Computing and Information Technology, vol. 21, Mar. 2013, pp. 23-34.
International Preliminary Report on Patentability for International Application No. PCT/US2015/032203 dated Nov. 29, 2016. (9 pages).
International Search Report and Written Opinion in PCT/US2015/032203 dated Jul. 22, 2015, 11 pages.
International Search Report and Written Opinion in PCT/US2017/057753 dated Feb. 12, 2018, 14 pages.
K. Valkili et al., Finding Regression Outliers with FastRCS, Cornell University Library, Feb. 2014, 23 pages.
M. Claesen et al., Hyperparameter tuning in Python using Optunity, International Workshop on Technical Computing for Machine Learning and Mathematical Engineering (TCMM), Sep. 2014, 2 pages.
Mitra et al., 2006. Multi-objective evolutionary biclustering of gene expression data. Pattern Recognition. 2006;39(12):2464-77.

(56) References Cited

OTHER PUBLICATIONS

N. Deshpande et al., Modelling Compressive Strength of Recycled Aggregate Concrete by Artificial Neural Network, Model Tree and Non-linear Regression, International Journal of Sustainable Built Environment, Dec. 2014, pp. 187-198.

N. Deshpande et al., Modelling Compressive Strength of Recycled Aggregate Concrete Using Neural Networks and Regression, Concrete Research Letters, vol. 4(2), Jun. 2013, pp. 580-590.

N. Sharma et al., Incorporating Data Mining Techniques on Software Cost Estimation: Validation and Improvement, International Journal of Emerging Technology and Advanced Engineering, vol. 2, Mar. 2012, pp. 301-309.

P. Ramesh, Prediction of Cost Overruns Using Ensemble Methods in Data Mining and Text Mining Algorithms, Master's Thesis, Graduate Program in Civil and Environmental Engineering, Rutgers University, Jan. 2014, 50 pages.

P.J. Edwards et al., The application of neural networks to the paper-making industry, Proceedings of the European Symposium on Artificial Neural Networks, Apr. 1999, 6 pages.

R. Strapasson et al., Tensile and impact behavior of polypropylene/low density polyethylene blends, Polymer Testing 24, 2005, pp. 468-473.

S. Zheng, Boosting Based Conditional Quantile Estimation for Regression and Binary Classification, Proceedings of the 9th Mexican international conference on Artificial intelligence, 2010, pp. 67-79.

S.C. Lhee et al., Development of a two-step neural network-based model to predict construction cost contingency, Journal of Information Technology in Construction, vol. 19, Sep. 2014, pp. 399-411.

S.T. Yousif et al., Artificial Neural Network Model for Predicting Compressive Strength of Concrete, Tikrit Journal of Engineering Sciences, vol. 16, 2009, pp. 55-63.

Schmidt, Michael D. et al. "Automated refinement and inference of analytical models for metabolic networks," Aug. 10, 2011, Physical Biology, vol. 8, No. 5. 36 pages.

Schmidt, Michael et al., "Distilling Free-Form Natural Laws from Experimental Data," Apr. 3, 2009, Science, vol. 324, No. 5923, pp. 81-85.

T. Kraska et al. MLbase: A distributed machine-learning system. In Proceedings of 6th Biennial Conference on Innovative Data Systems Research (CIDR'13), Jan. 6, 2013 (7 pages). Available at <http://cidrdb.org/cidr2013/Papers/CIDR13_Paper118.pdf>.

V. Chandwani et al., Applications of Soft Computing in Civil Engineering: A Review, International Journal of Computer Applications, vol. 81, Nov. 2013, pp. 13-20.

V. Chandwani et al., Modeling Slump of Ready Mix Concrete Using Genetically Evolved Artificial Neural Networks, Advances in Artificial Neural Systems, Nov. 2014, 9 pages.

Vladislavleva et al., Order of Nonlinearity as a Complexity Measure for Models Generated by Symbolic Regression via Pareto Genetic Programming. IEEE Transactions on Evolutionary Computation. 2008; 13(2): 333-49.

X. He et al., Practical Lessons from Predicting Clicks on Ads at Facebook, Proceedings of ADKDD'14, Aug. 2014, 9 pages.

Y. Shan et al., Machine Learning of Poorly Predictable Ecological Data, Ecological Modeling, vol. 195, 2006, pp. 129-138.

Y.X. Zhao et al., Concrete cracking process induced by steel corrosion—A review, Proceedings of the Thirteenth East Asia-Pacific Conference on Structural Engineering and Construction, Sep. 2013, pp. 1-10.

Z.A. Khalifelu et al., Comparison and evaluation of data mining techniques with algorithmic models in software cost estimation, Procedia Technology, vol. 1, 2012, pp. 65-71.

\* cited by examiner

| 401 | 403 | 405 | 407 | 409 | 411 | 413 |
|---|---|---|---|---|---|---|
| Locale ID | Store Address | Product Id | Description | Date | Quantity Sold | Amount Sold |
| 1 | 1234 Oak St., Columbus, OH 43202 | 7654 | Widget #1 | 8/8/2016 | 6 | $5.34 |
| 1 | 1234 Oak St., Columbus, OH 43202 | 5434 | Widget #2 | 8/8/2016 | 2 | $1.78 |
| 1 | 1234 Oak St., Columbus, OH 43202 | 4545 | Gasket #1 | 8/8/2016 | 10 | $18.9 |
| 1 | 1234 Oak St., Columbus, OH 43202 | 1233 | Gasket #2 | 8/8/2016 | 3 | $19.17 |
| 1 | 1234 Oak St., Columbus, OH 43202 | 7654 | Widget #1 | 8/9/2016 | 5 | $4.45 |
| 2 | 1234 Oak St., Columbus, OH 43202 | 5434 | Widget #2 | 8/9/2016 | 3 | $2.67 |

FIG. 4

Examples of forecasting models filters
229

Examples of forecasting model filters based on number of exogenous regressors and observations
229A if N < (366 + n_xreg), exclude "Linear Regression + Trend + Annual + Xreg"
if N < (365 + n_xreg), exclude "Linear Regression + Trend + Annual + Xreg"
if N < (9 + n_xreg), exclude "Linear Regression + Trend + Weekly + Xreg"
if N < (8 + n_xreg), exclude "Linear Regression + Weekly + Xreg"
if N < (3 + n_xreg), exclude "Linear Regression + Trend + Xreg"
if N < (2 + n_xreg), exclude "Linear Regression + Xreg"

Examples of forecasting model filters based on number of observations
229B if N < 729, exclude:
  o Auto-regressive Neural Network + Annual
  o Auto-regressive Neural Network + Xreg + Annual
  o Seasonal by Loess w/ ETS model + Annual
  o Seasonal by Loess w/ ARIMA model + Annual
  o Seasonal by Loess w/ ARIMA model + Annual + Xreg
if N < 364, exclude:
  o Seasonal Mean + Annual
  o Seasonal Median + Annual
  o Seasonal Naïve + Annual
if N < 15, exclude:
  o Auto-regressive Neural Network + Weekly
  o Auto-regressive Neural Network + Xreg + Weekly
  o Seasonal by Loess w/ ETS model + Weekly
  o Seasonal by Loess w/ ARIMA model + Weekly
  o Seasonal by Loess w/ ARIMA model + Weekly + Xreg
  o Bayesian Structural Time Series + Annual
  o Bayesian Structural Time Series + Weekly + Annual Examples of forecasting model filters based time series seasonality characteristics
229C if "seasonality" = 1, exclude:
  all algorithms with frequency != 1
if "seasonality" = 7, exclude:
  all algorithms with frequency == 1
  all algorithms with frequency == 364
  TBATS + Weekly + Annual
  BSTS + Annual
  BSTS + Weekly + Annual
if "seasonality" = 364, exclude:
  all algorithms with frequency == 1
  all algorithms with frequency == 7
  AASP
  BSTS + Weekly + Annual Examples of forecasting model filters based on detection of dead data and constant data
229D if StandardDeviation for Last 28 days == 0, exclude: everything except NAIVE forecasting models
if StandardDeviation(y) == 0, exclude: All Auto-regressive Neural Network (with or without Xreg and Seasonality)
if "features" is not passed, exclude: Linear Regression + Xreg

METHODS AND APPARATUS FOR SELF-ADAPTIVE TIME SERIES FORECASTING ENGINE

FIELD

At least some embodiments described herein relate generally to self-adaptive forecasting of time series in, for example, production environments.

BACKGROUND

A time series is a sequence of data points representing samples or observations often collected at discrete and equally spaced time intervals. Time series forecasting models estimate future data points for time-varying phenomena. Because time series can be noisy, chaotic, and nonstationary, the development of time series forecasters is often neglected. Moreover, some time series forecasting solutions can be inadequate for the estimation of highly volatile phenomena. In addition, modern ubiquitous compute devices are capable of capturing massive amounts of data correlated to a time series interacting in complex ways with forecasting processes of time-varying phenomena.

Therefore, a need exists for self-adaptive forecasting systems that can identify significant data affecting future values of a time-varying phenomena, and able to adapt and optimize forecasting techniques demanded by highly volatile environments.

SUMMARY

At least some embodiments described herein relate to forecasting systems that can take advantage of the benefits of modern computing mechanisms for capturing data, and are capable of adapting to highly volatile environments. In such embodiments, an apparatus has a memory with processor-executable instructions and a processor operatively coupled to the memory. The apparatus receives datasets including time series data points that are descriptive of a feature of a given entity. The processor determines a time series characteristic based on the data content, and selects, based on the determined characteristic, a set of entrant forecasting models from a pool of forecasting models stored in the memory. Next, the processor trains each entrant forecasting model with the time series data points to produce a set of trained entrant forecasting models. The processor executes each trained entrant forecasting model to generate a set of forecasted values indicating estimations of the feature of the given entity. Thereafter the processor selects at least one forecasting model from the set of trained entrant forecasting models based on an accuracy evaluation performed over the set of forecasted values.

BRIEF DESCRIPTION OF THE DRAWINGS

FIG. 4 is an example of a sample dataset including a time series with data points descriptive of multiple entity features, according to an embodiment.

FIG. 9 shows examples of forecast model filters used for selection of entrant forecasting models, according to an embodiment.

DETAILED DESCRIPTION

Figure 1:
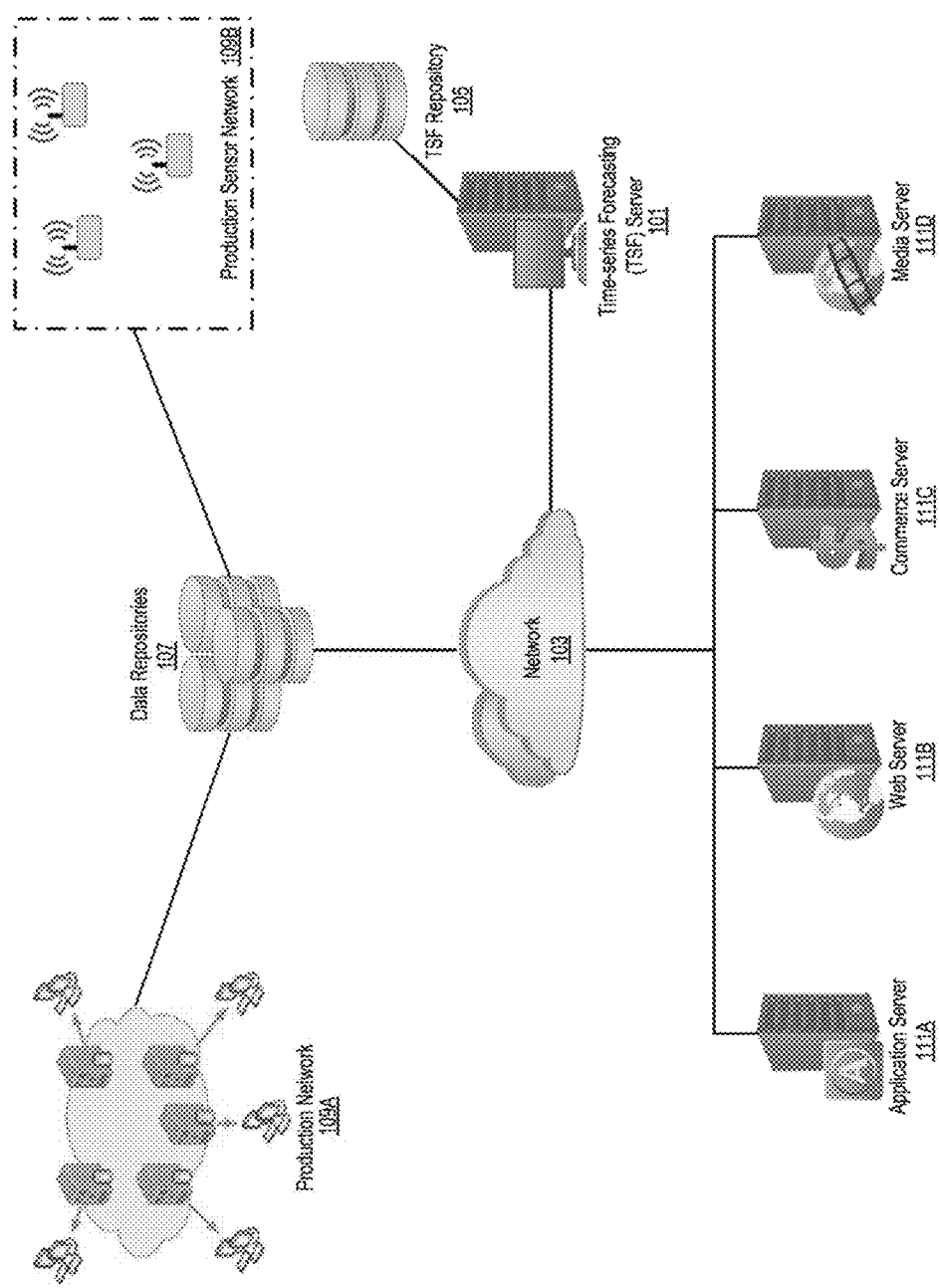
FIG. 1 is a schematic diagram of an implementation of a system for optimization of time series forecasting engine, according to an embodiment.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the embodiments of the subject technology. It, however, will be clear and apparent that the embodiments are not limited to the specific details set forth herein and may be implemented without these specific details. In some instances, well-known structures and components are shown in block diagram form to avoid obscuring the concepts of the disclosed embodiments.

The terms "computer", "processor", "computer processor", "compute device" or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), or any other compute device comprising one or more processors of any kind, or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure, or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, can also be provided separately in a distributed system or in any other suitable sub-combination.

Time series are sequences of data points representing samples or observations often collected at discrete and equally spaced time intervals. Time series can be generated, for instance, through the monitoring of industrial processes (throughput), tracking of corporate business metrics, stock market closing prices, measurements of budgetary expenses, measurements of product sales, and/or other suitable observations. Time series are characterized by having explicit order dependence between data points, i.e., they have a time dimension for time dependency providing additional heuristics for the forecasting of data points. Time series can further be characterized by their internal structure or patterns. Such patterns include, for example, trend patterns, seasonality patterns, cyclic patterns, correlation patterns, and other suitable time series patterns.

Time series analysis can be used to model stochastic mechanisms to forecast future data points of a time series based on information computed from observed or historical data points. Time series forecasting models can be evaluated based on their performance at predicting or estimating future data points and/or based on model fitness according to multiple information criteria.

At least some embodiments disclosed herein relate to methods and apparatus for self-adaptive time series forecasting engine. Such embodiments implement a self-adaptive system to select optimal forecasting models from a set of entrant forecasting models competing in an election contest. Advantageously, the embodiments described herein can modify their forecasting logic in response to exogenous factors and/or a self-assessment of their fitness or forecasting accuracy. In some embodiments a set of entrant forecasting models can be selected based on time series characteristics computed from sampled or observed data points. Thus, the number of forecasting models that are trained and tested for an election contest is limited to those forecasting models that have a significant chance of being elected. Some examples of computed time series characteristics include the number of time series samples or observations, determination of predictor variables (e.g., exogenous variables) relevant to the forecast of time series data points, sparseness of time series data points, variability of time series data points, autocorrelation of selected lags of a time series, partial autocorrelation of selected lags of a time series and other suitable time series characteristics.

At least some embodiments disclosed herein implement a systematic process to initiate multiple election contests over time in which one or more forecasting models are selected for deployment to a production environment. Election contests can be initiated based on one or more conditions including time dependent conditions, indications that forecasting accuracy of an incumbent forecasting model has degraded below a predetermined quality threshold, and/or any significant change on the time series characteristics considered during the election contest in which such an incumbent forecasting model was selected. Hence, these embodiments can adapt forecasting techniques to estimate data points of highly volatile time-varying phenomena that may be affected by multiple exogenous variables.

An implementation of a time series forecasting server ("TSF") 101 is discussed with reference to FIG. 1. Network 103, shown in FIG. 1, can include one or more types of communication networks. For example, such communication networks can include Internet connectivity, a local area network (LAN), a wide area network (WAN), a metropolitan area network (MAN), various types of telephone networks (including, for example, Public Switch Telephone Network (PSTN) with Digital Subscriber Line (DSL) technology) or mobile networks (including for example Global System Mobile (GSM) communication, General Packet Radio Service (GPRS), Code Division Multiple Access (CDMA), and other suitable mobile network technologies.), or any combination thereof. Communication within network 103 can be realized through any suitable connection (including wired or wireless) and communication technology or standard (wireless fidelity (WiFi™), 4G™, long-term evolution (LTE™), or other suitable standard).

In some implementations, network 103 couples TSF server 101 to multiple time series data sources including, for example, data repositories 107, application server 111A, web server 111B, commerce server 111C, media server 111D, and other suitable data sources not shown in FIG. 1. Alternatively or in addition, TSF server 101 can be directly coupled to time series data sources, as opposed to, via network 103. In some other implementations, TSF server 101 can include a time series monitoring system (not shown in FIG. 1) to capture time series data points. In such a case, TSF server 101 can alternatively receive and integrate data associated with the time series data points from server 111A, 111B, 111C, 111D, and/or data repositories 107 in for example a system memory or TSF repository 105.

TSF server 101 collects and/or receives datasets, via network 103. In some instances, time series have descriptive values or data points associated with a feature of an entity. In some other instances, each time series observation or sample can include a vector of values; these types of time series are known as multivariate time series. In some cases, time series are evenly spaced over time according to a constant scale or spaced time interval e.g., year, month, day, hour, second, and so forth. Examples of evenly spaced time series include monthly indices of industrial production of a given country, annual per capita gross domestic product for a group of countries, daily sales of a given product, and other suitable types of evenly spaced time series. In some other cases, time series data points are not evenly spaced over time but instead, are distributed unevenly depending on when an event occurs. These type of time series are generally called unevenly spaced time series. Examples of unevenly spaced time series include time series describing: traffic incidents on highways, natural disasters such as earthquakes and floods, and other suitable types of unevenly spaced time series.

In some implementations, TSF server 101 analyzes time series to determine time series characteristics that can be used to select a set of entrant forecasting models. A non-exhaustive list of time series characteristics that can be used to select a set of entrant forecasting models is provided with reference to Table 1.

TABLE 1

Examples of time series characteristics

| Type of analysis | Time series characteristic |
|---|---|
| Seasonality Analysis | Seasonal patterns |
| | Lack of seasonal patterns |
| | Time interval variations |
| | Strength of seasonality |
| | Hurst exponent |

TABLE 1-continued

Examples of time series characteristics

| Type of analysis | Time series characteristic |
| --- | --- |
| Variability analysis | Dead data |
| | Constant data |
| Analysis of number of variables | Number of observations and descriptive values or data points in the time series |
| | Number of exogenous variables relevant to the forecast of time series |
| Shape of distribution analysis | Skewness of time series and related distributions derived from time series |
| | Kurtosis of time series and related distributions derived from time series |

In some implementations, time series characteristics can be computed via machine learning techniques to, for example, compute a forecast of seasonal patterns, a forecast of frequency of dead data, a forecast of time series skewness, and other suitable time series characteristics.

TSF server 101 selects a set of entrant forecasting models from a set of candidate forecasting models, based on determined time series characteristics and/or based on characteristics of candidate forecasting models. Specifically, TSF server 101 can use one or more filters to select a set of entrant forecasting models and avoid training and testing an entire pool of candidate forecasting models. Thus, TSF server 101 executes an informed selection of entrant forecasting models that will participate in an election contest to minimize computational costs associated with training and testing candidate forecasting models that are unlikely to result in the most accurate forecasting estimations or fitness. Further functional and structural characteristics of forecasting model filters are further discussed, for example, with reference to FIG. 2 and FIG. 9.

TSF server 101 trains each of the selected entrant forecasting models with received and/or collected time series data points. TSF server 101 executes each of the trained entrant forecasting models to produce a set of forecasted values. The forecasted values indicate forecasted estimations of future data points of the time series. In some implementations, TSF server 101 uses the forecasted values to determine forecast accuracy scores of each of the trained entrant forecasting models. Accordingly, TSF server 101 can select one or more of the entrant forecasting models in a given election contest for deployment or implementation to a production environment based on their forecast accuracy scores. The deployed forecasting models can then produce forecasting values for the time series. Forecasted values can be used, for example, to inform users of a production network about expected outcomes of a time-varying phenomenon, automatically calibrate or continue such control compute devices based on expected outcomes, and/or other suitable applications.

In some implementations, TSF server 101 receives and/or collects data sets with time series data points and/or data associated with a time series from data repositories 107. In some instances, data repositories 107 implement enterprise resource planning ("ERP") systems, customer relationship management ("CRM") systems, relational and non-relational databases, big data platforms, file systems, sensor network databases, and other suitable applications storing datasets with time series data points and other relevant data affecting a time series. In some implementations, data repositories 107 are coupled to, for example, production network 109A and/or production sensor network 109B.

In some implementations, TSF server 101 can be communicatively coupled to TSF repository 105. TSF repository 105 can store a pool of untested forecasting models, training datasets, data structures to filter forecasting models, monitored time series data points, datasets with data associated with time series, forecasted values, computing forecasting accuracy score records, forecasting accuracy scores computing during elections contests and other suitable models, datasets, or data structures used by TSF server 101. Moreover, TSF repository 105 can store data computed during and in between election contests and data computed from received samples or observations of a time series. Such data includes the number of features (e.g., exogenous features) associated with a time series, variability of recent observations, standard deviation of recent observations, compute time to produce forecasted data points, mean absolute error (MAE), mean absolute percent error (MAPE), mean absolute scaled error (MASE), root-mean-square error (RMSE), Akaike information criterion corrected (AICc), mean of the test set, standard deviation of the test set, normalized root mean square error, coefficient of variation, and other suitable values. Alternatively, in other implementations, some or all of the data stored in TSF repository 105 can reside in TSF server 101 as shown in the example implementation of TSF server 101 discussed with reference to FIG. 2.

Production network 109A can be, for example, a corporate network storing data in data repositories 107. In some implementations, production network 109 can include multiple sites or applications providing services nationwide and/or worldwide including local area networks (LAN), metropolitan area networks (MAN), wide area network (WAN), and other suitable networks. Accordingly, time series data and/or data associated with time series can be generated or derived from data generated at production network 109A, and stored in data repositories 107.

Production sensor network 109B can be, for example, a spatially-distributed autonomous sensor network(s) deployed to monitor physical or environmental data at given times, such as temperature, number of customers entering a store, number of vehicles crossing a road, and other suitable data. Accordingly, time series data and/or data associated with time series can be generated at production sensor network 109B and stored in data repositories 107.

In some implementations, TSF server 101 can receive and/or collect data sets with time series data points and/or data associated with a time series from servers 111A, 111B, 111C, 111D, and other suitable servers. Examples of application server 111A include a server hosting fitness tracking applications from which TSF server 101 collects biometric values monitored from multiple users, a server hosting a social network application from which TSF server 101 collects social sentiments, and/or other suitable applications generating time series data points or enrichment data for time series data points. Web server 111B can host, for example, news websites, weather forecast websites, stock trade websites, and other suitable websites from which TSF server 101 collects time series data points and/or data associated with a time series. Examples of commerce server 111C include, servers hosting online shopping applications, online marketplace applications, business-to-business data exchange applications, and other suitable applications from which TSF server 101 collects time series data points and/or data associated with a time series. Examples of media server 111D include on-demand service providers of music, movies, television programs, and other media servers from which TSF server 101 collects time series data points and/or data associated with a time series.

Internal structures of an implementation of TSF server 101 are discussed with reference to FIG. 2. Bus 219 couples numerous devices of TSF server 101. For instance, bus 219 communicatively couples processor 207 with read-only memory 209, system memory 203, network communication interface 205, forecaster input interface 211, and forecaster output interface 213. Processor 207 can retrieve instructions and data structures to execute the processes of embodiments described herein. From memory units 203 and 209, alternatively, or additionally processor 207 can retrieve instructions and data structures from TSF repository 105 (FIG. 1).

Processor 207 can be a single processor, a multi-core processor, or an arrangement of processors in different implementations. In some instances, processor 207 can be any suitable processor such as, for example, a general-purpose processor, a field programmable gate array (FPGA), an application specific integrated circuit (ASIC), a virtual processor mapped to a logical processor configured in processor 207, and/or other suitable hardware device.

Processor 207 implements data collector and preprocessing engine 215, data analyzer and filtering engine 217, model training engine 219, model testing engine 221, and elected forecasting engine 223. Data collector and preprocessing engine 215 captures and/or retrieves time series data and data associated with a time series from private data repositories (e.g., private data repositories 107 shown in FIG. 1) and/or semi-public data sources (e.g., servers 111A, 111B, 111C, and 111D also shown in FIG. 1). In some implementations, data collector and preprocessing engine 215 executes one or more preprocessing operations on captured or retrieved data. Examples of preprocessing operations performed by data collector and preprocessing engine 215 include normalization operations, splitting of datasets, merging of datasets, and other suitable preprocessing operations. In some implementations, data analyzer and filtering engine 217 determines time series characteristics such as occurrences of dead data periods, number of sampled time series data points, number of exogenous variables or covariant relevant to the forecast of time series data points, analysis of time intervals values of a time series, constant data analysis, and other suitable time series analysis.

In some instances, data analyzer and filtering engine 217 determines seasonality characteristics of a time series based on correlation measures of data points in a lag of a time series, e.g., via an autocorrelation function (ACF). In other instances, data analyzer and filtering engine 217 determines seasonality characteristics of a time series based on a partial autocorrelation function (PACF) applied to data points in a lag of a time series. Partial autocorrelation measures are a type of autocorrelation in which lower-order correlations are removed or subtracted from the outcome measure.

In some implementations, data analyzer and filtering engine 217 determines one or more seasonality characteristics of a time series when ACF and/or PACF measures reach a statistically significant value. For example, a time series can be deemed to include seasonality characteristics when a lag of the time series is determined to have a PACF that is greater than the significant value (SV) given by:

$$SV = \frac{i}{\text{sqrt}(N)} \quad (1)$$

where N is the length or size of the time series and i is the number of standards deviations corresponding to a desired confidence level (e.g., 68%→i=1, 95%→i=2), however it is not necessary that i must be an integer value. In some instances, the value of i may depend on a tolerance including seasonality characteristics based on false positives, compared to a tolerance neglecting seasonality characteristics because of false negatives. For instance, a seasonality detection process can avoid false negatives (that is, indications that there are no seasonality characteristics in a time series when there are) by using a lower confidence level i. In some implementations, seasonality detection processes can be configured to output a binary result, that is, either a time lag includes seasonality characteristics or it does not. In such a case, SV can be calculated with, for example, i=3. Accordingly, data analyzer and filtering engine 217 can determine that a lag of a time series includes seasonality characteristics when its PACF is greater than its SV, and a determination of no seasonality characteristics is made when such a PACF is smaller or equal to SV.

In some implementations, different values of SV can be used to determine time series seasonality characteristics to filter entrant forecasting models. A first $SV_1$ threshold can be calculated by i=4. If a time series lag shows a PACF greater than the $SV_1$ it is determined that the time series includes seasonality characteristics. In such a case, forecasting model filters can exclude forecasting models that are not adept to produce forecasts for seasonal time series from a set of entrant forecasting models. A second $SV_2$ threshold can be calculated by setting i=2. If a time series lag shows a PACF that lays within the range $[SV_1, SV_2]$, then it is determined that the time series may or may not include seasonality. Thus, forecasting model filters can include forecasting models that are adept to produce forecast for seasonal and non-seasonal time series. If a time series lag shows a PACF that is below $SV_2$ then forecasting model filters can include only forecasting models adept to produce forecasts for non-seasonal time series. Examples of forecasting model filters based on PACF with respect to SV are given by:

$$\begin{cases} \text{only seasonal} & PACF > \frac{4}{\text{sqrt}(N)} \\ \text{seasonal and nonseasonal} & \frac{2}{\text{sqrt}(N)} \leq PACF \leq \frac{4}{\text{sqrt}(N)} \\ \text{only nonseasonal} & PACF < \frac{2}{\text{sqrt}(N)} \end{cases} \quad (2)$$

The above i values for calculating SV are some examples that can be used to define SV thresholds; other suitable values however, can be equally assigned to i for the purpose of filtering forecasting models.

In some instances, data analyzer and filtering engine 217 can determine characteristics of multiple seasonality for instance, weekly and annual seasonality. In such a case, entrant forecasting models that are constrained to handle only one seasonality can be trained and tested multiple times, once for each of the determined seasonality characteristics. In some implementations, time series lags used during seasonality detection processes can be selected based on enrichment data obtained from, for example, semi-public data sources 303 discussed with reference to FIG. 3. For example, data associated with social sentiment, weather, and economy can be used to select a time series lag with a minimum number of samples that is likely to include seasonality patterns of a time series.

Model training engine 219 trains a selected set of entrant forecasting models using fitness and training datasets selected from sampled datasets 227. Model testing engine 221 tests forecasting accuracy of a set of entrant forecasting models by comparing estimated or forecasted time series values with observed or sampled values. In some implementations, model testing engine 221 selects one or more entrant forecasting models based on their forecasting accuracy for deployment to a production network or for their implementation in elected forecasting engine 223. In some implementations, model testing engine 221 selects entrant forecasting model(s) that show greatest fitness or forecasting accuracy when compared to other entrant forecasting models and/or entrant forecasting model(s) showing a forecasting accuracy greater than a predetermined threshold, e.g., forecast accuracy score higher than 90% or another suitable threshold.

Elected forecasting engine includes one or more forecasting models implemented to provide forecasting values according to a time series. In some implementations, the forecasting values are stored in system memory 203 in forecast values data structure 231. In some implementations, TSF server 101 executes periodic forecasting accuracy assessments of the forecasting models implemented in elected forecasting engine 223. In some implementations, TSF server 101 performs a forecasting accuracy assessment by comparing forecasted time series values stored in 231 with sampled datasets of the time series stored at 227. Based on the forecasting accuracy assessment outcome, TFS server 101 can command an election contest for the replacement of an incumbent forecasting model(s) implemented at 223. In some further implementations, TSF server 101 can command replacement of incumbent forecasting model(s) implemented at 223 based on a time condition, for example, daily, monthly, yearly, or on the basis of other suitable condition.

The read-only memory (ROM) 209 stores static data and instructions used by processor 207 and/or other components of TSF server 101. System memory 203 can be a read-and-write memory device or other suitable type of memory. In some instances, one or more components of system memory 203 can be implemented on a virtual memory to compensate for physical memory shortages by temporarily transferring data from system memory 203 to a disk file to simulate additional memory space. System memory 203 stores some of the processor-executable instructions, data structures, and data that processor 207 uses at runtime including data structures to define and manage a pool of untested forecasting models 225, sampled datasets 227, forecasting models filters 229, forecasted values 231 and other suitable data.

In some implementations, a pool of untested forecasting models 225 includes a set of pre-compiled forecasting models configured with an input interface to receive training data sets. Pool of untested forecasting models 225 includes data structures and processes to instantiate, configure, and manage forecasting models. A non-exhaustive list of forecasting models for univariate and multivariate time series that reside in the pool of untested forecasting models 225 are provided with reference to Table 2.

TABLE 2

Examples of time series forecasting models

| Class | Forecasting model |
|---|---|
| Markov Chain Monte Carlo | Bayesian structural time-series Hamiltonian Monte Carlo model |
| Autoregressive | Autoregressive Moving Average (ARMA) Moving Average (MA) model Autoregressive (AR) model Autoregressive Moving Average Vector |

TABLE 2-continued

Examples of time series forecasting models

| Class | Forecasting model |
|---|---|
| Exponential Smoothing Models | Holt-Winter's Model, e.g., triple exponential smoothing Double exponential smoothing Simple or Single Exponential Smoothing |
| Nonlinear Regression Models | Autoregressive Neural Network Autoregressive Neural Network with multiple hidden layers |
| Non-regression based models | Seasonal naïve Naive mean Naive with drift Trend and Seasonal Components |
| Non-parametric regression | Additive Model Spline Interpolating Model |
| Linear Regression models | Simple Linear Regression Multiple Linear regression |
| Shrinkage Models | Lasso, Ridge Regression Least Angle Regression |

Sampled datasets 227 include a set of time series samples or observations captured or received by TSF server 101. Sample datasets 227 include time series data and data associated with a time series. In some instances, TSF server 101 divides sampled datasets 227 into training and testing datasets, as discussed below with reference to FIG. 6.

Forecasting models filters 229 include a set of filters used by TSF server 101 in the selection of forecasting models. In general, TSF server 101 uses forecasting model filters 229 to exclude forecasting models of a pool of untested forecasting models. Forecasting models excluded by forecasting model filters 229 are not considered as entrant forecasting models for the selection of new forecasting model(s) in an election contest. Thus, in some instances, TSF server 101 does not invest time and/or computational resources in training and testing forecasting models excluded by filters 229. Forecasting model filters 229 can exclude one or more forecasting models based on, for example, one or more time series characteristics determined by TSF server 101. Examples of time series characteristics that can be used by forecasting model filters 229 include seasonality, dead data, number of samples in a time series (i.e., sample size), constant data in a time series, number of exogenous regressors associated with a time series, and other suitable time series characteristics further explained with reference to FIG. 9.

Forecasted values 231 includes time series data points estimated by elected forecasting model(s), and/or estimated by entrant forecasting models under consideration during an election contest. In some instances, TSF server 101 uses forecasted values 231 to determine forecasting accuracy of an elected forecasting model implemented in elected forecasting engine 223. In some other instances, TSF server 101 uses forecasted values 231 to compare forecasting accuracy of entrant forecasting models considered to replace an incumbent forecasting model implemented in elected forecasting engine 223.

Forecaster input interface 211 enables users or non-person entities to enter configuration files to, for example, set up a forecasting model filter, modify a time condition performance assessment of an incumbent forecasting model(s), and/or other suitable configuration files. Input devices that can be used with input interface 211 include, for example, alphanumeric keyboards, pointing devices, touch screen interfaces, and other suitable input devices.

Figure 11:
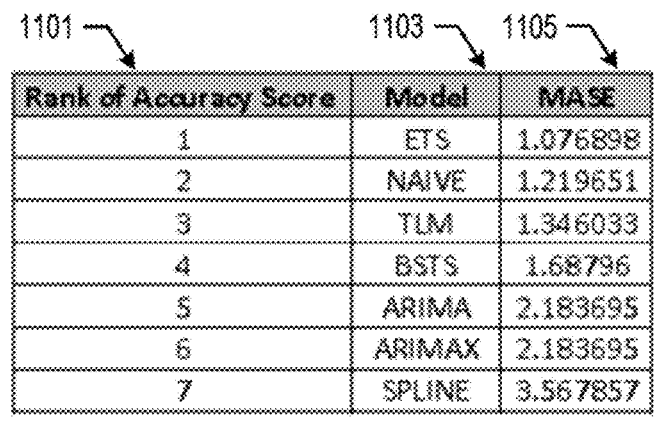
FIG. 11 is an example of forecast accuracy scores computed for a set of trained entrant forecasting models, considered in an election contest according to an embodiment.

Forecaster output interface 213 enables, for example, the display of visualization tools for the understanding and estimated values of time series. For example, in some implementations, forecaster output interface can be a graphical user interface displaying a comparison between forecasted values and observed values over time. Similarly, a graphical user interface can display information regarding selection of training datasets and testing datasets (as shown, for example, in FIG. 8), forecast accuracy scores of entrant forecasting models (as shown in FIG. 11), projected values for a time series and other suitable information regarding processed at TSF server 101.

Network communication interface 205 communicatively couples TSF server 101 to a network (e.g., network 103 shown in FIG. 1). Network communication interface 205 can include one or more network interface cards (NICs). In some implementations, network communication interface 205 can employ connection protocols including, direct connect, Ethernet (thick, thin, twisted pair 10/100/1000 Base T, and/or the like), Token Ring, wireless connection such as IEEE 802.11a-x, and/or the like. In some implementations, multiple network communication interfaces 205 can be used to engage with various communications networks. For instance, multiple network communication interfaces 205 can be used to enable communications of TSF server 101 over broadcast, multicast, and/or unicast networks. Thus, TSF server 101 can be part of network 103 in FIG. 1 and receive time series data and other data associated with time series data from multiple systems and compute devices shown in FIG. 1.

In some instances, users and non-person entities (e.g., other computer-based systems) can use a TSF Application Programming Interface (API) to configure, update, control, and perform other suitable operations on the engines implemented in processor 207, and data structures discussed with reference to system memory 203. Such an API is further discussed below with reference to FIG. 3.

In some implementations, one or more TSF server components discussed with reference to FIG. 2 can be implemented in a physical compute device, a virtual machine or any combination thereof, including machine clusters linking physical and/or virtual machines, cluster of application containers running on another cluster of virtual machines or other suitable virtualized or non-virtualized implementations. For instance, one or more TSF servers 101 can be implemented as virtual machines in a hypervisor or kernel. In such a case, each virtual TSF server can use the hypervisor's underlying hardware as if it were the only virtual machine in the hypervisor.

Generally, optimization of a time series forecasting engine can be executed through an ingestion phase, extraction phase, transformation phase, loading phase, and machine learning phase. These phases are discussed with reference to FIG. 3.

Figure 2:
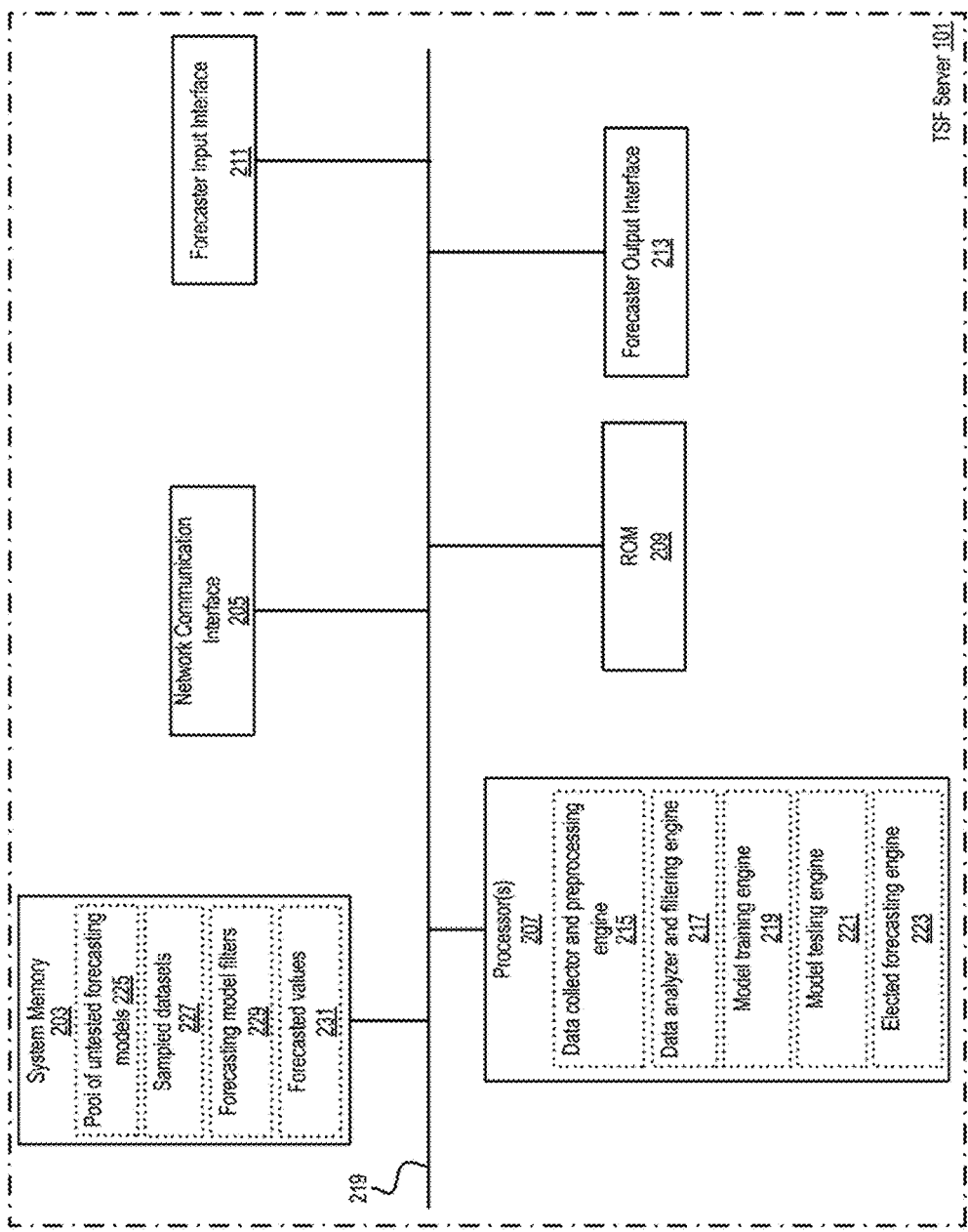
FIG. 2 is a block diagram illustrating an example of a compute device configuration for an implementation of a system for time series forecasting engine, according to an embodiment.
Figure 3:
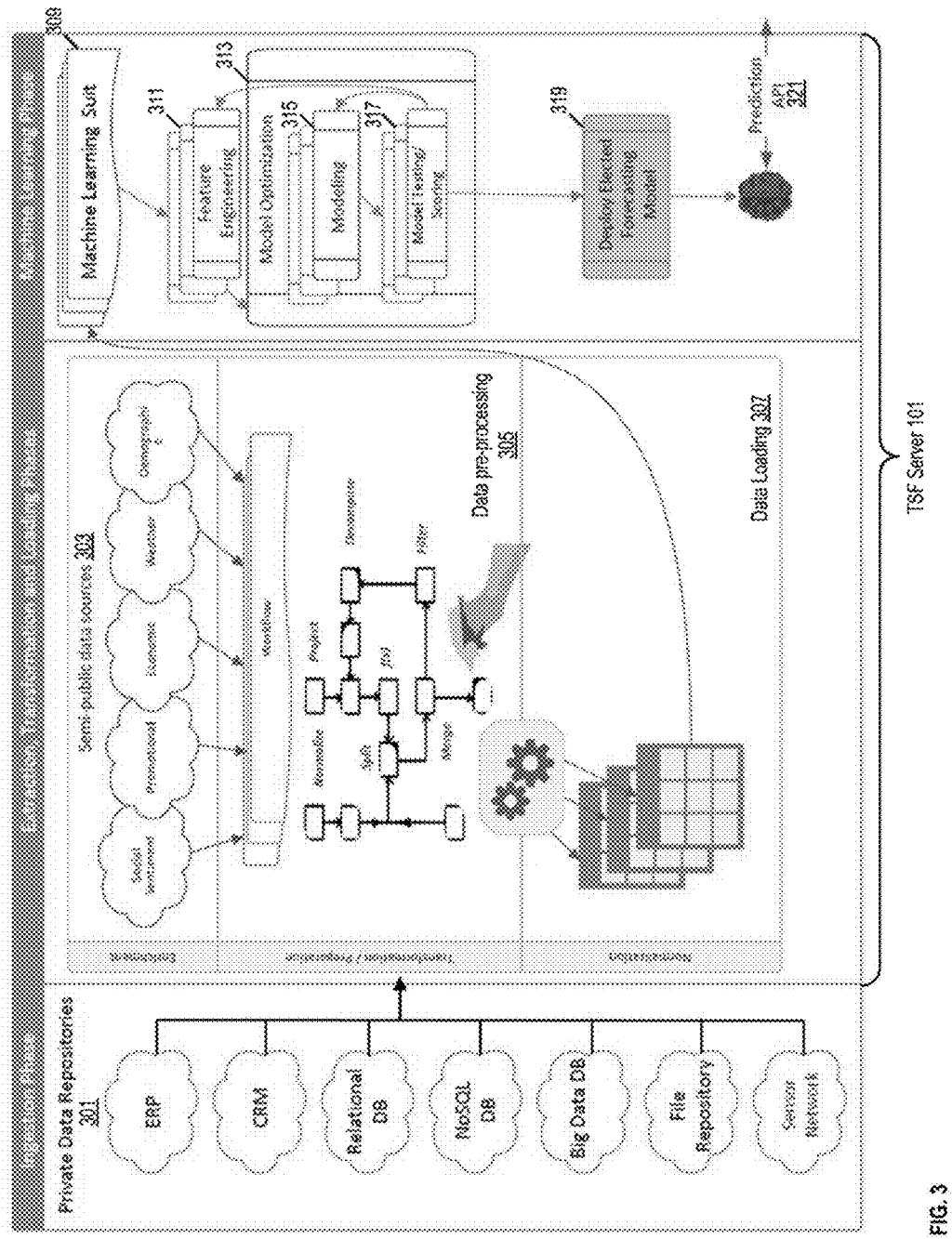
FIG. 3 is a diagram illustrating examples of stages of a method for optimization of time series forecasting engine, according to an embodiment.

As shown in FIG. 3, during a data ingestion phase, TSF server 101 retrieves or captures time series data and/or data associated with a time series from private data repositories 301. Examples of private data repositories 301 include ERP systems (as discussed with reference to FIG. 1), CRM systems (also discussed in FIG. 1), relational and non-relational databases, big data platforms, file repository systems, sensor network databases, and other suitable applications storing datasets with time series data points. In some implementations, TSF server 101 can retrieve cross-sectional time series data points from one or more of private data repositories 301. In some implementations, users and non-person entities can submit and/or configure a data stream with time series data and/or data associated with a time series through an API implemented, for example, in data collector and preprocessing engine 215 discussed above with reference to FIG. 2.

In some implementations, during an extraction phase, TSF server 101 can retrieve or capture enrichment data from semi-public data sources 303. Semi-public data sources 303 can be implemented in, for example, servers 111A-111D discussed with reference to FIG. 1 or other suitable platforms. In some instances, TSF server 101 can retrieve enrichment data or other suitable type of data via a public API provided by semi-public data sources 303. In some other instances, when there are no public API available for example, a private dedicated channel can be implemented between TSF server 101 and semi-public data sources 303. In some implementations, TSF server 101 can pull enrichment data from semi-public data sources 303, while in other implementations semi-public data sources 303 can push enrichment data to TSF server 101. In some instances, enrichment data can convey data associated with a time series, for example, social sentiment, promotional or advertising data, economic conditions, climatic conditions, demographic data, and other suitable enrichment data. For instance, time series data points (e.g., number of sales per day) can be enriched with descriptive data of climatic conditions of a day (e.g., rainy, sunny, or other suitable climatic descriptive values). In some instances, enrichment data is integrated into forecasting models to achieve greater forecasting accuracy. For example, forecasted sales for a given store can vary depending on whether the next day will be a rainy or sunny day. Accordingly, in some instances, TSF server 101 trains entrant forecasting models to produce forecasted data points of a time series model taking into account exogenous variables extracted from semi-public data sources 303. In some alternative or additional implementations, TSF server can retrieve or capture cross-sectional data from semi-public data sources 303 for the training of entrant forecasting models.

In some implementations, during a transformation phase, data extracted, captured and/or received at TSF server 101 can be subjected to different data pre-processing operations 305 to generate datasets that can be used to, for example, analyze time series to determine time series characteristics, train and test forecasting models, and other suitable processes or operations. During transformation phase, TSF server 101 can convert heterogeneous datasets formatted in distinct native formats (i.e., native formats used by semi-public data sources or private data repositories) to a canonical format or format-agnostic configuration. In some instances, TSF server can split datasets and merge datasets or part of datasets with other datasets obtained from different data sources. In some instances, TSF server 101 can replace missing data with substituted values ("unit imputation"). Examples of unit imputation techniques that can be used by TSF server 101 include mean imputation, last value carried forward, imputation based on logical rules, imputation based on missed predictors, imputation based on zero coding or topcoding, and other suitable imputation techniques. In some other instances, when missing data is significantly large or above a predetermined tolerance threshold, TSF server 101 can use complex imputation techniques such as, multivariate imputation, iterative regression imputation, and other suitable imputation techniques.

In some instances, TSF server 101 can normalize datasets obtained from heterogeneous data sources, organize attributes and relations of associated data minimizing data redundancy and maximizing data integrity. In some implementations, pre-processed data is organized and formatted in a form that is ready to be used in the optimization of a time series forecasting engine. During data loading 307, preprocessed data is loaded to one or more storage units coupled to TSF server 101, for example, TSF repository 105 shown in FIG. 1, system memory 203 shown in FIG. 2, and/or other suitable memory.

In some implementations, during a machine learning phase, machine learning suite 309 is activated to perform feature engineering operations 311, and model optimization 313, for the selection, implementation, and/or deployment of optimal forecasting model(s) 319. During feature engineering 311, TSF server 101, determines what features or data can be useful for the forecasting of time series. For instance, climatic condition features can be used to more accurately forecast the number of sales expected to be made at a given store. Accordingly, in some implementations, TSF server 101 can analyze past observations or samples of sales time series along with other associated data to categorize exogenous or covariant features, as strongly relevant, weakly relevant, or irrelevant, and consequently integrate relevant and/or weakly relevant features into model optimization 313.

In general, TSF server 101, selects a group of entrant forecasting models from, for example, a pool of untested forecasting models 225, discussed with reference to FIG. 2. In some instances, the selection of the entrant forecasting models depends on characteristics of a time series and features (relevant and/or weakly relevant) identified during feature engineering process 311. TSF server 101 trains entrant forecasting models during modeling phase 315 using, for example, time series samples or observations and time series data associated with the time series (e.g., identified relevant features) stored in sampled datasets 227 in FIG. 2 and/or TSF repository 105. Thereafter, trained forecasting models are tested to determine their fitness and/or forecasting accuracy at 317. Forecasting model(s) displaying superior forecasting accuracy and/or fitness are elected for deployment to a production environment and/or implementation. Training, testing and election of forecasting model(s) are further discussed with reference to FIG. 6.

In some implementations, deployed elected forecasting model(s) 319 are coupled to a production environment, for example, production network 109A, production sensor network 109B, shown with reference to FIG. 1, and other suitable production environments. In some instances, users or non-person entities can request and retrieve forecasting values for a time series via prediction API 321.

An example of time series showing the number of products sold by location data and data associated with a time series is discussed with reference to FIG. 4. Dataset 400 includes data values sampled from, for example, production network 109A, production sensor network 109B, servers 111A-111D (all shown in FIG. 1), or other suitable data sources. Locale ID field 401 includes an identification number of a store monitored by TSF server 101 or monitored by other compute device coupled to TSF server 101. Store address field 403 includes addresses of monitored stores. Product ID field 405 is an identifier of products available at one or more stores. Description ID field 407 includes textual description of products available at one or more stores. Date field 409 includes time stamps indicating when a product was sold at a given store. Quantity sold field 411 includes a numeric value indicating a number of units sold at a given store. Amount sold field 413 includes a numeric value indicating a monetary amount of a transaction (e.g., sale) made at a given store.

In some implementations, one or more of the variables (fields) shown in the dataset 400 and/or other additional variables can be determined by TSF system 101 through metadata extraction associated with a dataset. Some examples of metadata that can be obtained to complement dataset 400 include, descriptions of products, categories of products, types of products, relationship among products, product sizes, product colors, promotional information, labor costs, manufacturing costs, weather values at a given time, e.g., time of selling transaction, demographics for a store at the point of sale, and other suitable data.

In some implementations, dataset 400 can be stored and handled by TSF server 101 in a canonical format, a relational database format, a comma separated values format, a non-relational database format (e.g., JavaScript Object Notation), or other suitable format. In some implementations, TSF server 101 can use all the available data retrieved in a input dataset (e.g., dataset 400). In other implementations, depending on the outcomes of feature engineering process 311 discussed with reference to FIG. 3 one or more data values can be disregarded by TSF server 101 for forecasting purposes. For example, TSF server 101 can disregard values in dataset 400 that are identified (during featuring engineering process 311, FIG. 3) as weakly relevant, or irrelevant to the estimation of sales of a given product.

Dataset 400 is an example of time series data and data associated with a time series that can be used to forecast sales of given products and is not intended to suggest any limitation as to the scope of use and/or functionality of the presently disclosed embodiments. The disclosed embodiments can be equally implemented to forecast time series corresponding to other domains, for instance, to forecast production values of a manufacture plant, forecast animal migration patterns, forecast systems life expectancy and maintenance times, and other suitable observations described as time series.

Figure 5:
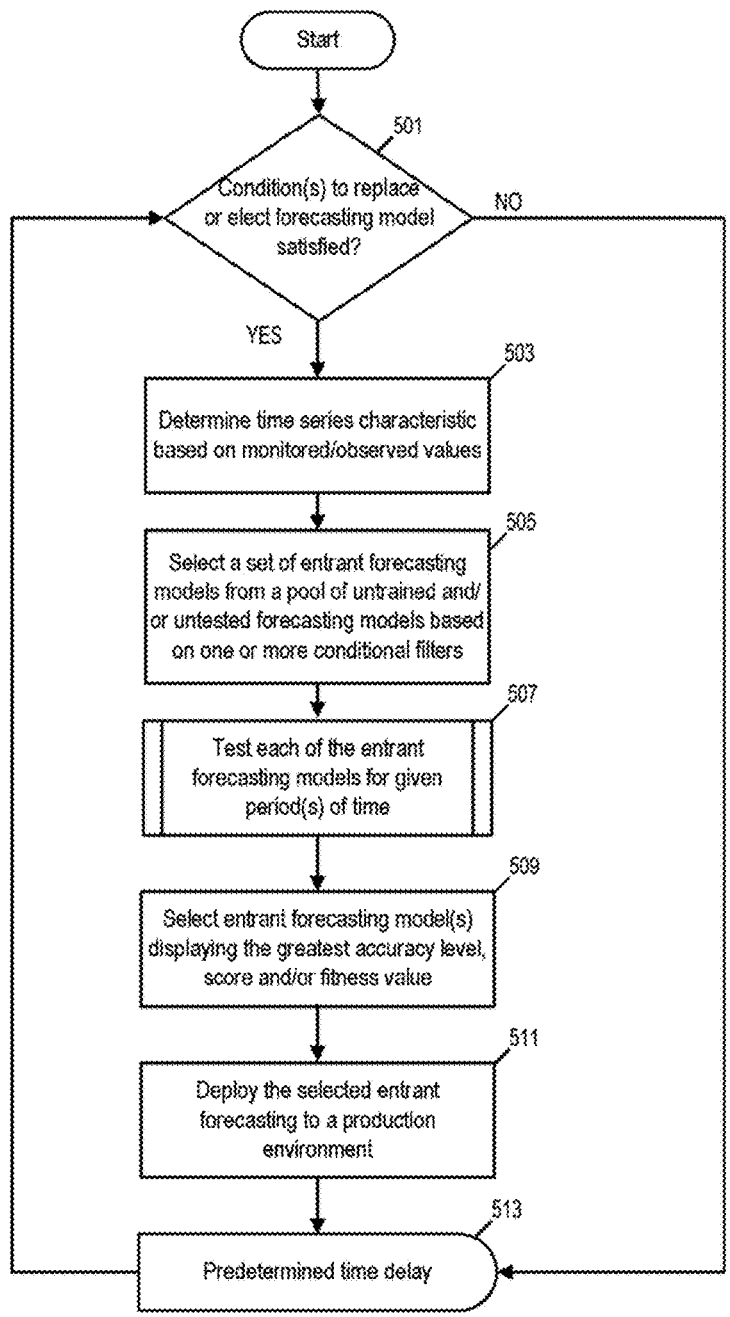
FIG. 5 is a flowchart illustrating a systematic process for training and selecting forecasting time series models over time, according to an embodiment.

The flowchart discussed with reference to FIG. 5 shows some of the processes executed by TSF server 101 during optimization of a time series forecasting engine. During the process illustrated in FIG. 5, TSF server 101 monitors incumbent forecasting model(s) (e.g., performance of elected forecasting model or models implemented at 223 FIG. 2), time series data, and data associated with a time series.

At 501, TSF server 101 determines if one or more conditions to replace an incumbent forecasting model are satisfied. In some instances, when there is no incumbent forecasting model (e.g., when there is no active incumbent forecasting model), then TSF server 101 initiates an election contest to elect a forecasting model. In some instances, TSF server 101 initiates an election contest to replace an incumbent forecasting model upon a determination that a forecast accuracy score of an incumbent forecasting model has decreased below a pre-determined threshold. Likewise, TSF server 101 can initiate an election contest to replace an incumbent forecasting model upon a determination that a fitness value of an incumbent forecasting model has decreased below a pre-determined threshold.

In some other instances, TSF server 101 initiates an election contest to replace incumbent forecasting model(s) upon an indication that new relevant features of a time series can improve the forecasting accuracy of an incumbent forecasting model or other forecasting models.

In yet some other instances, TSF server 101 initiates an election contest to replace an incumbent forecasting model based on a time limit imposed over incumbent forecasting model(s). For instance, TSF server 101 can force an election contest to replace an incumbent forecasting model once a day, week, month, or at other suitable time interval. The time limit assigned to an elected forecasting model can be a constant time. In some instances however, TSF server 101 can assign a time limit based on how well an incumbent forecasted model performed in an election contest. For instance, elected entrant forecasting model(s) that outperformed by small margins other entrant forecasting models competing in an election contest can be assigned a shorter time limit. Therefore, a subsequent election contest is scheduled for a shorter time limit than the time limit given to elected entrant forecasting models that had outperformed other entrant forecasting models by larger margins. Likewise, TSF server 101 can initiate an election contest upon determination of differences between training time series datasets used in the implementation of incumbent forecasting models and recently ingested datasets. For instance, time series datasets resembling evenly spaced data points can eventually indicate data points at unevenly spaced time intervals. In such a case, TSF server 101 forces a new election contest based on the observed changes.

In some instances, when conditions to replace or elect forecasting model(s) at 501 are not satisfied, then the process is halted at 513 for a predetermined time delay, once the time delay is exhausted, the logic flow restarts at 501. In some implementations, TSF server 101 can compute during time delay 513 a fitness evaluation of an incumbent forecasting model or models or a forecasting accuracy evaluation of the incumbent forecasting model(s). In some implementations, TSF server 101 can compute a fitness evaluation of an incumbent forecasting model based on, for example, information criterion such as Akaike information criterion, Bayesian information criterion, or other suitable quality measure of a time series forecasting model. Two examples of conditions associated with forecasting accuracy that can be tested at 501 are provided below:

Example 1 Condition based on Mean Absolute Percentage Error (MAPE): An election contest can be initiated when MAPE of an incumbent model increases by 25% or more, OR when MAPE increases 10 points, whichever is larger. Thus, if MAPE of an incumbent forecasting model raises from 20% to 25% (25% of 20% is 5%), then TSF server 101 initiates an election contest because there was an increase of 25% or more. Likewise, if MAPE of an incumbent forecasting model rises from 20% to 30%, TSF server 101 initiates an election contest because the incumbent forecast model increased its MAPE by 10 units.

Example 2 Condition based on Mean Absolute Scale Error (MASE): TSF server 101 can force an election contest when MASE increases by 0.055 or more units.

Examples 1 and 2 illustrate some conditions to force an election contest defined based on forecast accuracy scores. Further examples of forecast accuracy scores that can be used to initiate election contests computed by TSF server 101 are discussed with reference to FIG. 11.

At 503, TSF server 101 determines time series characteristics based on monitored data points of a time series and/or datasets with data associated with a time series. Examples of time series characteristics determined at 503 include occurrences of dead data periods, number of observations or samples available for training and/or testing (i.e., sample size), constant data, exogenous variables associated with a time series, sparseness of time series data points, standard deviation of time series data points, shape distribution of a time series, and other suitable time series characteristics.

As discussed above, some time series have inherent "seasonality", shown, for example, as data that repeats patterns every n days. For instance, restaurants generally have weekly seasonality, where the days of the week are related by the same customer ratios week after week. Some forecasting models can include seasonality as a feature, which will increase forecast accuracy on that data. However, including a seasonality feature or characteristic during training of a forecasting model when an observed time series does not exhibit seasonality patterns can tamper its forecasting accuracy. Thus, in some instances TSF server 101 determines, at 503, if a time series includes seasonality patterns.

In some implementations, the selection of entrant forecasting models is executed via forecasting model filters, which take as input time series characteristics and return as output identifiers of forecasting models adept to estimate data points of a time series having the inputted characteristics. Forecasting models filters are further discussed with reference to FIG. 9.

Time series characteristics determined at 503 are used to select a set of entrant forecasting models at 505 from a pool of candidate forecasting models, e.g., from a pool of untested forecasting models 225 discussed with reference to FIG. 2. Thus, in some instances, forecasting models from the pool of candidate forecasting models can be excluded based on the time series characteristics determined at 503. For example, forecasting models known to underperform at forecasting data points of time series with seasonality patterns can be excluded from the set of entrant forecasting models when time series include seasonality patterns. For another example, when there are no observations or there are insufficient observations for a time series to train entrant forecasting models, only naive forecasting models would be selected to be part of the set of entrant forecasting models.

In some implementations, data gathered during the last election contests is used to select the set of entrant forecasting models. For instance, TSF server 101 can limit the number of forecasting models included in the set of entrant forecasting models by considering the higher ranked forecasting models in a previous election contest. In other words, in some instances, TSF server 101 can save computational costs associated with election contests when there is testing data from the last or previous election contest indicating that an entrant forecasting model has little or no likelihood to be elected in a subsequent election contest.

At 507, each of the entrant forecasting models is trained and tested to produce estimates or forecast of time series data points for a given testing period(s) of time. Some examples illustrating the identification of training and testing datasets are discussed below with reference to FIG. 7 and FIG. 8.

Once a final set of entrant forecasting models is selected, each entrant forecasting model produces, at 507, forecast data points for one or more testing time periods. Thereafter, based on the forecast data points, TSF server 101 generates forecast accuracy scores (e.g., scores shown in FIG. 11) for each entrant forecasting model. In some implementations, the forecast accuracy scores are generated by comparing data points forecasted for a given time period with observations or samples captured during the time period. Thus, entrant forecasting models generating forecast data points closer to the observations or samples are given higher scores. In some instances, entrant forecasting models are tested at 507 during multiple test periods i.e., cross-validation. Testing entrant forecasting models over more than one testing time period is advantageous in scenarios in which sampled time series contain anomalous or outlying data points. When only testing periods with anomalous or outlying data points are used, forecast accuracy scores can be tampered and hence, the elected forecasting model(s).

In some instances TSF server 101 selects, at 509, an entrant forecasting model having superior forecasting scores than the rest of the models in the set of entrant forecasting models. In some other instances, TSF server 101 selects, at 509, more than one entrant forecasting model upon a determination that a combination of entrant forecasting models having different structures leads to higher forecasting accuracy. In some implementations, selection of entrant forecasting model(s) at 509 can be further based on additional factors including number of relevant features (as determined in feature engineering process 311 in FIG. 3), variability of recent observations, standard deviation of recent observations, compute time of an entrant forecasting model to produce forecasted data points, an information criterion, (e.g., Akaike information criterion, Bayesian information criteria, or other suitable information criteria), mean of the test set, standard deviation of the test set, and other suitable accuracy measures or scores discussed with reference to parts 609 and 613 of testing phase flowchart shown in FIG. 6.

In some instances, TSF server 101 selects an entrant forecasting model, at 509, to replace incumbent forecasting model(s) upon a determination that the forecasting accuracy of the entrant forecasting model ("replacement model") is superior than the forecasting accuracy of the incumbent forecasting model. For instance, TSF server 101 can periodically compute forecasting accuracy measures of an incumbent forecasting model. In some implementations, TSF server 101 uses forecasting accuracy measure of the incumbent forecasting model to establish a replacement condition such that the incumbent forecasting model is not replaced by an entrant forecasting model having lesser forecasting accuracy than the incumbent forecasting model. For instance, TSF server 101 can be configured to authorize a replacement for incumbent forecasting model(s) only when a replacement model has shown a superior forecasting accuracy than the incumbent forecasting model, for instance, an increase on forecasting accuracy in the order of 5%, 10%, or other suitable predetermined threshold.

A selected forecasting model(s) in an election contest is deployed at 511 to a production environment. For instance, the selected forecasting model can be deployed and implemented in elected forecasting engine 223 discussed with reference to FIG. 2, and/or deployed to production network 109A or production sensor network 109B, both shown in FIG. 1 or other suitable production environment. Thereafter, the process is halted for a predetermined time delay at 513 as discussed above.

Figure 6:
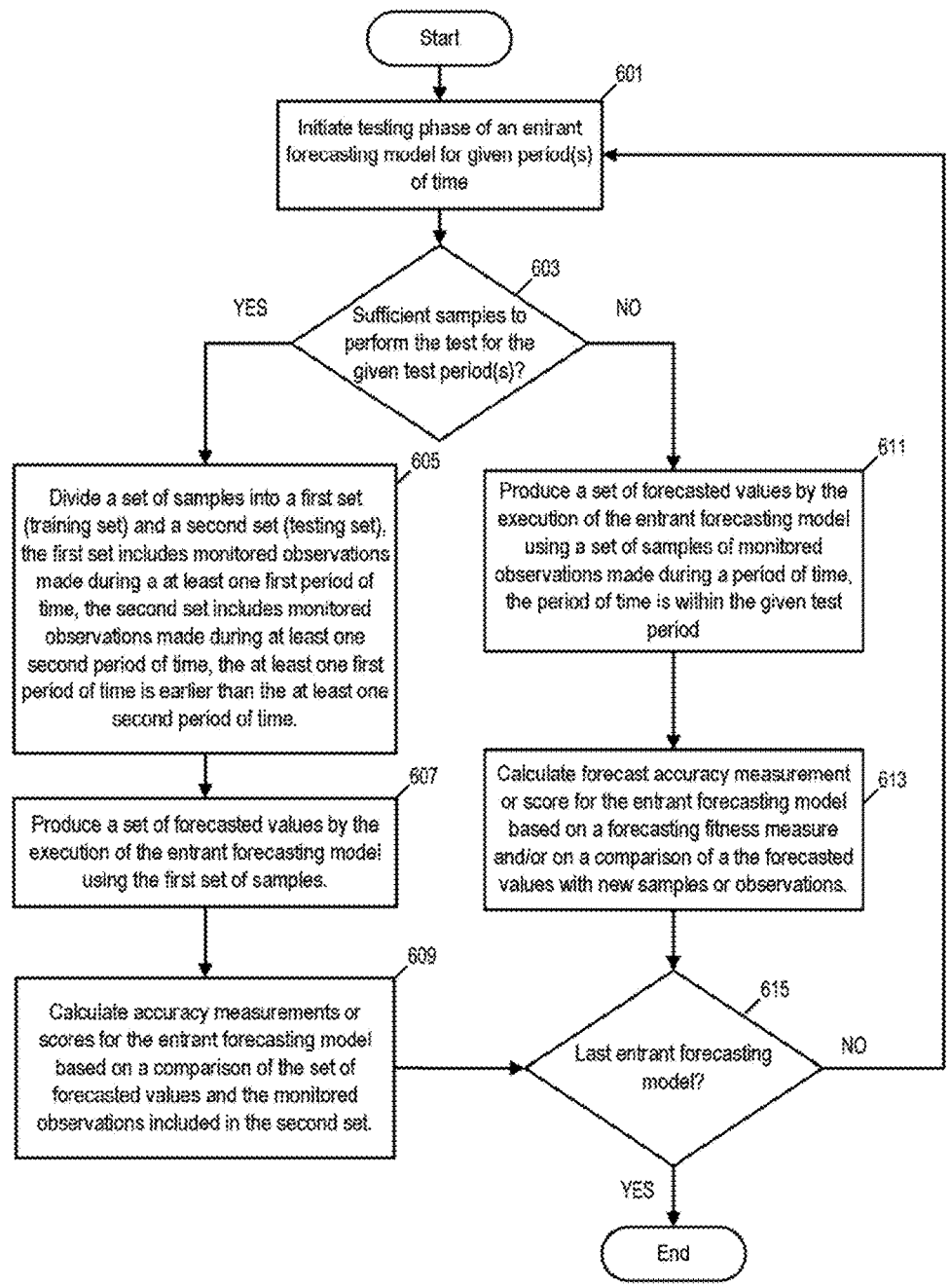
FIG. 6 is a flowchart illustrating two examples of forecasting models training techniques based on a number of data points in a time series sample, according to an embodiment.

An example of a process to train and test a set of entrant forecasting models as shown at 507 in FIG. 5 is discussed with reference to FIG. 6. Specifically, FIG. 6 shows training and testing of a set of entrant forecasting models. At 601, TSF server 101 can initiate a testing phase of an entrant forecasting model for given period(s) of time. As discussed above, in some instances, each entrant forecasting model from the set of entrant forecasting model are tested over more than one time period.

In some instances, testing of entrant forecasting models can vary depending on the number of observations or samples available at the TSF server 101. For instance at 603, TSF server 101 determines if a sufficient number of samples or observations are available to test an entrant forecasting model for a given time period. As discussed above, in some implementations, TSF server 101 can store sampled data points of a time series in TSF repository 105 shown in FIG. 1, system memory 203 shown in FIG. 2, or other suitable repository.

In some instances, TSF server 101 determines, at 603, that there are sufficient samples available to test an entrant forecasting model for some given time period(s). Thus, at 605, TSF server 101 divides the set of available samples into a first set (i.e., a training set) and a second set (i.e., the testing set). The first set includes sampled data points of a time series captured during at least one first time period. For example, the first set can include data points of a time series sampled from January 2016 through June 2016. In such a case, the first set can be used as a training set to test the entrant forecasting model using a second set i.e., for example, a testing set including data points of the time series sampled from July 2016 through August 2016. In general, training and testing data sets can be defined in multiple ways as long as the training sets are made of data points that were sampled during a time period earlier than the time period when data points of the testing sets were sampled. Further examples to define training and testing datasets are discussed below with reference to FIG. 7 and FIG. 8.

At 607, TSF server 101 trains an entrant forecasting model using data points of the time series included in the first set (i.e., training set). Some machine learning techniques that can be used during the training process include sliding-window methods, recurrent sliding windows, hidden Markov models, maximum entropy Markov models, input-output Markov models, conditional random fields, graph transformer networks, and other supervised machine learning techniques. TSF server 101 executes the trained entrant forecasting model to produce a set of forecasted data points of the time series.

At 609, TSF server 101 calculates forecast accuracy scores for the entrant forecasting models based on, for example, a comparison of the set of forecasted data points with data points included in the second set (i.e., testing set). For instance, a forecast error can be defined as:

$$e_i = y_i - \hat{y}_i \tag{3}$$

where $y_i$ is the $i^{th}$ observed or sampled data point of a testing set and $\hat{y}_i$ is a forecasted data point. In some instances, a forecast accuracy score for an entrant forecasting model can be computed by calculating a Mean Absolute Error (MAE):

$$MAE = \frac{1}{n}\sum_{i=1}^{n} e_i \tag{4}$$

where n is the number of pairs ($y_i$, $\hat{y}_i$) used during a testing phase of an entrant forecasting model. MAE measures the average magnitude of a set of errors $|e_i|$ in a set of forecasted data points $|\hat{y}_i|$ as the average of the absolute difference between forecasted data points and actual observations in which all individual differences have equal weight. In some instances, a forecast accuracy score for an entrant forecasting model can be computed by calculating a Root Mean Squared Error (RMSE):

$$RMSE = \sqrt{\frac{1}{n}\sum_{i=1}^{n} (y_i - \hat{y}_i)^2} \tag{5}$$

where n is the number of pairs ($y_i$, $\hat{y}_i$) used during a testing phase of an entrant forecasting model. RMSE measures the average magnitude of the error as the average of squared differences between forecasted data points and actual observations. In RMSE errors e, are squared before they are averaged. RMSE grants a relatively high weight to large forecast errors. Accordingly, TSF server 101 can favor entrant forecasting models with forecast accuracy scores based on RMSE in instances when large errors are particularly undesirable.

MAE and RMSE are some examples of measures that can be used to compute forecast accuracy scores. In some instances, TSF server 101 can use more than one technique to evaluate forecast accuracy of entrant forecasting models. Further forecast accuracy techniques include computing mean absolute percentage errors (MAPE), mean absolute scaled errors (MASE), normalized root mean square error (NRMSE), coefficient of variation (CV), mean of forecasted values (MFV), standard deviation of forecasted values (SFV), and other suitable measures for the assessment of accuracy of forecasted data points.

The logic flow is then directed to conditional statement 615 where TSF server 101 verifies whether the current entrant forecasting model is the last entrant forecasting model in a set of entrant forecasting models. If the current entrant forecasting model is the last entrant forecasting model of the set, then the process ends. If, however, the current entrant forecasting model is not the last entrant forecasting model then, the process continues at 601.

In some instances, TSF server 101 can determine at 603 that there are insufficient samples to perform testing of an entrant forecasting model. In such a case, TSF server 101 trains the entrant forecasting model with any available observations or samples of time series data points. Then, the trained entrant forecasting model is executed to produce a set of forecasted data points at 611.

In some instances, TSF server 101 computes a forecast accuracy score at 613, based on forecasting fitness measures, for example, by using an information criterion computed from the trained entrant forecasting model. Some examples of information criteria that can be used to compute such a fitness measure include criteria based on Akaike information criterion (AIC) (including AIC corrected information criterion), Bayesian information criterion (BIC), and other suitable information criterion. In some other instances, TSF server 101 computes a forecast accuracy score at 613 based on a comparison of the set of forecasted data points with time series data points acquired at a later period of time than the time when the training dataset was sampled. Thereafter, the logic flow is directed to conditional statement 615 as discussed above.

TSF server 101, stores each of the trained entrant forecasting models and their computed forecast accuracy scores in memory (e.g., TSF repository 105, in FIG. 1, system memory 203 in FIG. 2 or other suitable memory). TSF server 101 uses the forecast accuracy scores computed for each of the entrant forecasting models to select entrant forecast model(s) as elected forecast in models of an election contest.

Figure 7:
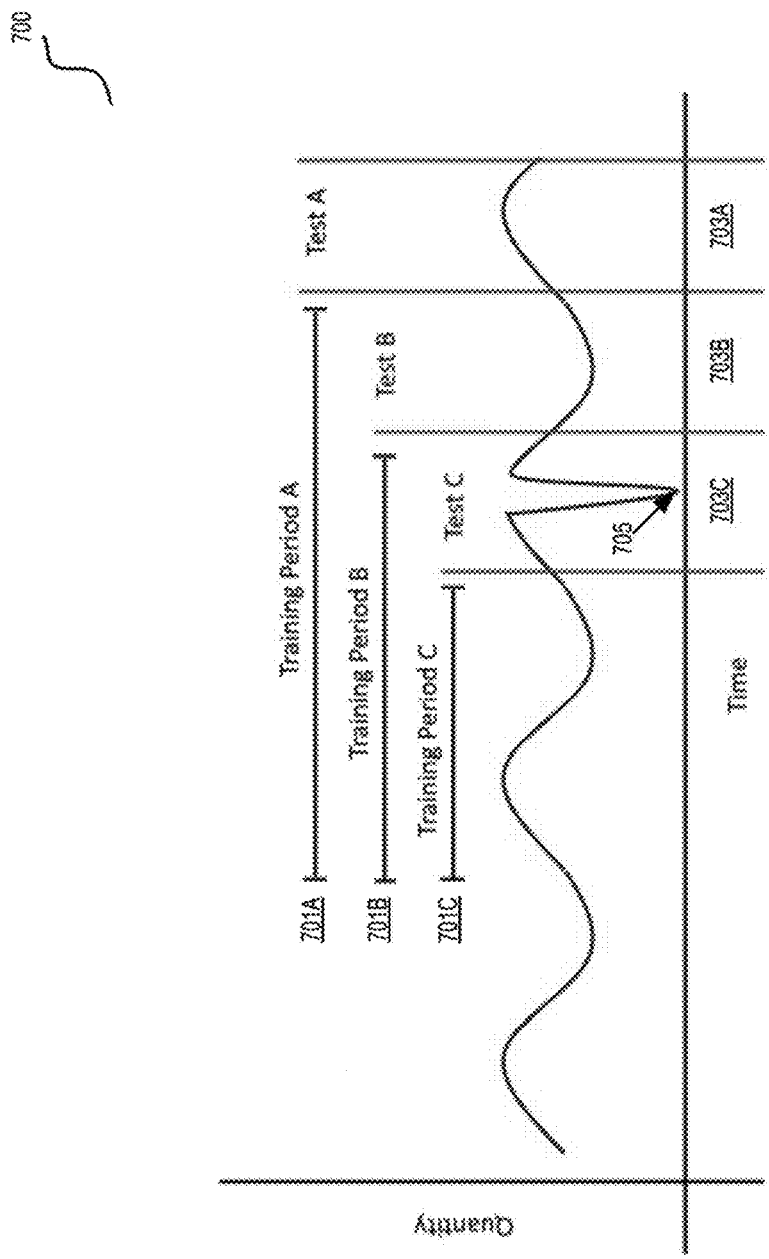
FIG. 7 is an example of a graph of sampled time series data points having an outlier value, illustrating a first technique to define training periods and testing periods, according to an embodiment.

TSF server 101 uses multiple strategies to define training and testing datasets from samples of a time series. Two examples of such strategies are discussed with reference to FIG. 7 and FIG. 8. A time series of a monitored quantity over time is shown in FIG. 7. The graph 700 can describe for example a quantity such as, temperature of a given location, financial indexes, power consumption, or other suitable continuous or discrete variable. Observations or samples of time series data points such the ones shown in FIG. 7 can reside in TSF repository 105 (FIG. 1), system memory 203 (FIG. 2) or other suitable memory communicatively coupled to TSF server 101.

In some instances, TSF server 101 defines training datasets from a sampled time series by selecting one or more time periods included in the time series, for instance, training datasets 701A, 701B, and 701C in FIG. 7. In this instance, training datasets 701A, 701B, and 701C have overlapping data points, that is, training dataset 701B includes all the data points of training dataset 701C, and training dataset 701A includes all the data points of training dataset 701B and hence, 701C. In other instances however, training datasets can be defined to include non-overlapping or mutually exclusive datasets.

In some instances, samples of a time series can include anomalous or outlier data points that are not representative of the data points of a time series, for example the vertex in the pronounced minimum point 705. When training datasets are strongly characterized by anomalous data points, forecasting accuracy of a forecasting model can be impaired. Therefore, in some instances, TSF server 101 trains entrant forecasting models with more than one training dataset. Moreover, large outliers/anomalies in the observations can cause a false negative when detecting seasonality. In some implementations, anomalies such as the vertex in the pronounced minimum point 705 are removed from observations or time series data points to determine seasonality characteristics. In such a case, data point 705 is removed only during the execution of seasonality detection processes discussed with reference to data analyzer and filtering engine 217 (FIG. 2) and may be removed for training and/or testing the dataset.

In some instances, TSF server 101 defines testing datasets from a sampled time series by selecting one or more time periods included in the time series, for instance, testing periods A, B, and C respectively labeled as 703A, 703B, and 703C in FIG. 7. Testing periods are defined to compute a forecasting accuracy score of a trained entrant forecasting model. For example, an entrant forecasting model trained with training dataset 701C can be tested during testing period 703C. In such a case, such an entrant forecasting model would use knowledge learned from training dataset 701C to generate forecast data points of the time series for the testing period 703C. Because in general, an entrant forecasting model uses data points included in training period 701C to forecast data points within test period 703C, it can be appreciated that the entrant forecasting model may fail or can be imprecise at estimating the data point corresponding to the vertex 705. This estimation failure or imprecision can be overcome by subsequently training the entrant forecasting model with training sets 701A and 701B.

TSF server 101 computes forecasting accuracy scores for each entrant forecasting model during testing periods, e.g., testing periods 703A, 703B, and 703C. Forecasting accuracy scores are generally computed as a function of a comparison between a forecasted data point for time i with a time series data point sampled or observed at time i. In some instances, TSF server 101 computes an overall forecasting accuracy score for a given entrant forecasting model by computing descriptive statistics (e.g., mean, mode or other suitable descriptive statistics) on a set of forecasting accuracy scores computed for an entrant forecasting model. Example techniques to compute forecasting accuracy scores were discussed above with reference to 609 and 613 shown in FIG. 6.

Figure 8:
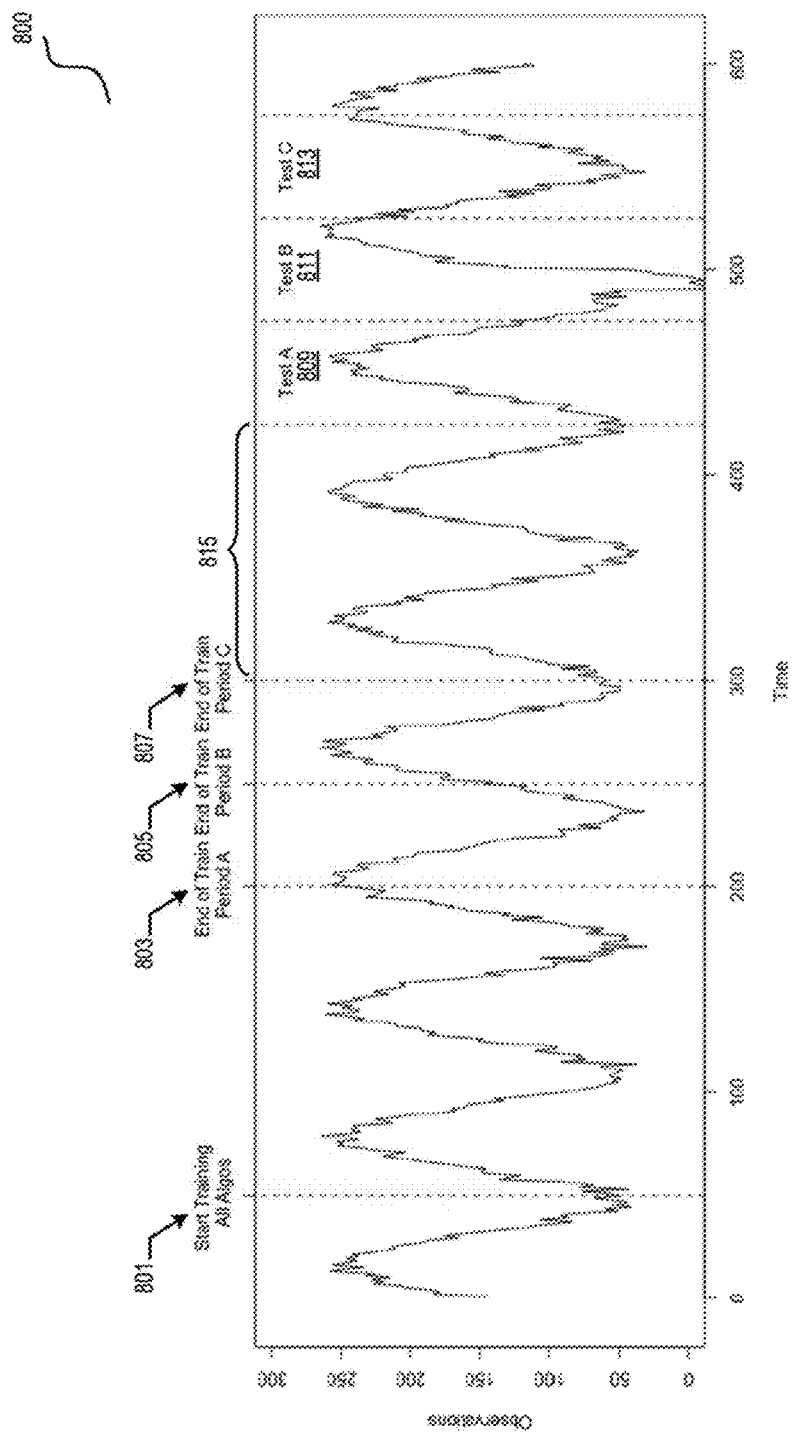
FIG. 8 is an example of a graph of sampled time series data points illustrating a second technique to define training periods and testing periods, according to an embodiment.

A second example to define training datasets and testing datasets is illustrated in FIG. 8. Similar to FIG. 7, three training datasets are defined with time series data points sampled during training period A (starting at time labeled as 801 and ending at time labeled as 803), training period B (starting at time labeled as 801 and ending at time labeled as 805), and training period C (starting at time labeled as 801 and ending at time labeled as 807). Moreover, testing datasets 809, 811, and 813 can be defined as discussed above. A variation between FIG. 7 and FIG. 8 is dead period 815. In some instances, the addition of dead period 815 between training periods and testing periods can be used to determine an expected forecasting accuracy score after a delta time 815, for instance, to answer expectation questions on how accurate an entrant forecasting model is expected to be after a day, week, month or other delta period of time.

One of the strategies TSF server 101 uses to save computational load otherwise spent in training and testing entrant forecasting models with little or no chance to be elected includes the use of filtering forecasting models. Forecasting model filters contain logic to exclude forecasting models (otherwise selected from a pool of untested forecasting models 225 (FIG. 2)) based on time series characteristics, characteristics of sampled time series data, and/or characteristics of data associated with a time series. Forecasting model filters exclude forecasting models that have little or no chance to be selected in an election contest. Examples of logical aspects of forecasting model filters 229 are illustrated in FIG. 9.

Generally, a set of entrant forecasting models can be selected based on the number of sampled data points of a time series available to TSF server 101. In some instances, some forecasting models can show better performance (measured by accuracy, fitness, processing time, or other suitable measure) than others when they are conditioned to be trained with a number of samples or observations greater or equal to a minimum number of samples. In some other instances, the number of samples or observations can depend on requirements given by the forecasting model per se and/or random variation in a time series. Accordingly, in some implementations, TSF server 101 can include a look-up table indicating a number of training samples to be used with each forecasting model. In some other implementations, the number of training samples can be included in forecasting model filters as discussed below with reference to FIG. 9. Table 3 shows a non-exhaustive list of numbers of samples for training time series forecasting models.

TABLE 3

Number of Samples/Observations per Forecasting Model

| Forecasting Model | Samples (N) |
|---|---|
| ARIMA + Covariate Regressor (Xreg) | 1 |
| ARIMA + Xreg + Weekly | 1 |
| Autoregressive Integrated Moving Average (ARIMA) | 1 |
| ARIMA + Weekly | 1 |
| ETS | 1 |
| Error, Trend, Seasonal (ETS) + Weekly | 1 |
| Box-Cox transform, ARMA errors, Trend, and Seasonal components (BATS) + Weekly | 1 |
| Trigonometric, Box-Cox transform, ARMA errors, Trend, and Seasonal components (TBATS) + Weekly | 1 |
| TBATS + Annual | 1 |
| TBATS + Weekly + Annual | 1 |
| Auto-regressive Neural Network | 3 |
| Auto-regressive Neural Network + Xreg | 3 |
| Bayesian Structural Time Series | 3 |
| Bayesian Structural Time Series + Weekly | 3 |
| Spline | 4 |
| Seasonal Mean + Weekly | 7 |
| Seasonal Median + Weekly | 7 |
| Seasonal Naïve + Weekly | 7 |
| Auto-regressive Neural Network + Weekly | 15 |
| Auto-regressive Neural Network + Xreg + Weekly | 15 |

TABLE 3-continued

Number of Samples/Observations per Forecasting Model

| Forecasting Model | Samples (N) |
|---|---|
| Seasonal by Loess w/ETS model + Weekly | 15 |
| Seasonal by Loess w/ARIMA model + Weekly | 15 |
| Seasonal by Loess w/ARIMA model + Weekly + Xreg | 15 |
| Bayesian Structural Time Series + Annual | 15 |
| Bayesian Structural Time Series + Weekly + Annual | 15 |
| Seasonal Mean + Annual | 364 |
| Seasonal Median + Annual | 364 |
| Seasonal Naïve + Annual | 364 |
| Auto-regressive Neural Network + Annual | 729 |
| Auto-regressive Neural Network + Xreg + Annual | 729 |
| Seasonal by Loess w/ETS model + Annual | 729 |
| Seasonal by Loess w/ARIMA model + Annual | 729 |
| Seasonal by Loess w/ARIMA model + Annual + Xreg | 729 |
| Linear Regression + Xreg | 2 + n_xreg |
| Linear Regression + Trend + Xreg | 3 + n_xreg |
| Linear Regression + Weekly + Xreg | 8 + n_xreg |
| Linear Regression + Trend + Weekly + Xreg | 9 + n_xreg |
| Linear Regression + Annual + Xreg | 365 + n_xreg |
| Linear Regression + Trend + Annual + Xreg | 366 + n_xreg |

Additional filtering criteria can be used to further narrow the number of forecasting models included in a set of entrant forecasting models. For example, filters shown at 229A in FIG. 9 can filter forecasting models based on the number of available time series data points and a number of exogenous variables identified to be relevant for the forecast of time series data points. For another example, filters shown at 229B can filter forecasting models based on the number of available time series data points in cases when no relevant exogenous variables for the forecasting of a time series are identified. For yet another example, the filters shown at 229C can filter forecast models based on seasonality characteristics.

Forecasting model filters shown at 229D filter entrant forecasting models based on standard deviation of a time series lag. For instance, nave forecasting models can be used when the standard deviation of a time series lag indicates the occurrence of dead data on a predetermined period of time (e.g. dead data occurrence during the last 28 days). Dead data occurrences can be uncovered in time series indicating the number of a certain item sold at a store. If no items were sold in the last 28 days then the standard deviation for that item will be equal to zero. In this case, it can be determined that there are not sufficient samples or observations to train non-naïve forecasting models therefore, only naive forecasting model will be included in the set of entrant forecasting models. Likewise, when the time series data points indicate a constant number, the standard deviation of such time series will be equal to zero. In such a case, forecasting model filters can exclude all non-nave forecasting models from the set of entrant forecasting models.

Other types of filters also shown in 229D include filters that are based on the number of features determined to be relevant in the forecasting of time series data points also referred to as exogenous variables or covariates. In cases when no relevant covariates or exogenous variables are identified, then forecast model filters can exclude forecasting models that use exogenous regressors.

Figure 10:
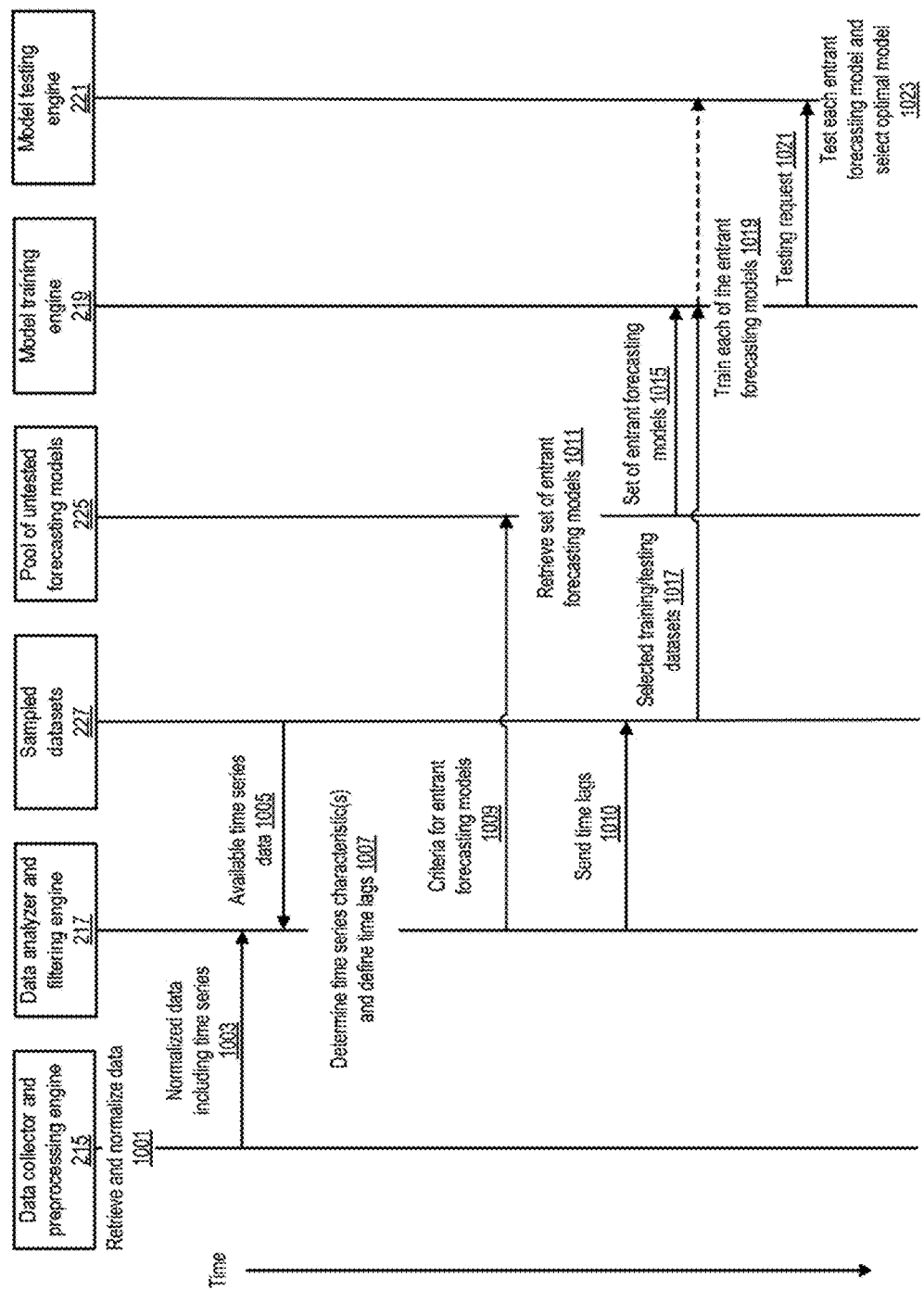
FIG. 10 is a signal flow illustrating an exchange of signals between components of a time series forecasting system, according to an embodiment.

An example of digital signals exchanged among components of TSF server 101 for the optimization of a time series forecasting engine is shown in FIG. 10. In some implementations, data collector and preprocessing engine 215 retrieves time series data and data associated with a time series at 1001. In some instances, data collector and preprocessing engine 215 performs multiple operations over the retrieved data (as discussed above with reference to FIG. 2) to normalize or convert the data into a canonical format such that, the retrieved data is integrated with other associated data residing at TSF server 101 or a repository coupled to the TSF server. At 1003, data collector and preprocessing engine 215 sends normalized data including time series data points to data analyzer and filtering engine 217. In some instances, data analyzer and filtering engine 217 receives available time series data 1005 already residing at a memory of TSF server or at a repository coupled to TSF server. Thereafter, data analyzer and filtering engine 217 determines, at 1007, one or more time series characteristics and time lags corresponding to training and testing periods based on an analysis of time series data received at 1003 and 1005.

Data analyzer and filtering engine 217 sends criteria for selection of entrant forecasting models 1009 to pool of untested forecasting models 225. The criteria sent at 1009 is based on determined time series characteristics computed at 1007 and types of forecasting models indicated to have a chance to be selected in an election contest as determined by forecasting filters discussed with reference to FIG. 9. Pool of untested forecasting models 225 receives the criteria sent at 1009 and retrieves a set of entrant forecasting models at 1011 satisfying the criteria given at 1009. Pool of untested forecasting models 225 sends, at 1015, the set of entrant forecasting models to model training engine 219.

Data analyzer and filtering engine 217 sends a digital signal with time lags, at 1010, to sampled dataset 227 for the selection of training datasets and/or testing datasets. Thereafter, training datasets are selected from the sampled datasets 227 and forwarded, at 1017, to model training engine 219. In some instances, when sufficient sampled datasets are available, testing datasets are selected from the sampled datasets 227 and forwarded, at 1017, to model testing engine 221.

Model training engine 219 trains, at 1019, each entrant forecasting model from the set of entrant forecasting models received at 1015 with the training datasets received at 1017. Thereafter, model training engine 219, sends at 1021, a testing request to model testing engine 221. In some instances, model testing engine 221 tests, at 1023, each of the entrant forecasting models of the set of entrant forecasting models using testing datasets received at 1017. In such a case, forecast accuracy scores can be computed based on comparisons of forecasted data points with testing data sets. In other instances, when training datasets are not available, forecast accuracy scores for each of the entrant forecasting model can be computed by using an information criterion as discussed above with reference to FIG. 6. Model testing engine 221, selects, at 1023, one or more entrant forecasting models from the set of entrant forecasting models based on computed forecast accuracy scores. In some instances, model testing engine 221 can select more than one entrant forecasting model, for example, upon a determination that a combination of entrant forecasting models having different structures leads to higher forecast accuracy scores. In some implementations, the forecasting model(s) selected at 1023 are implemented in elected forecasting engine 223 discussed with reference to FIG. 2 or can be deployed to a production environment, for example, to production network 109A and/or production sensor network 109B (both discussed with reference to FIG. 1).

An example of ranked forecasting accuracy scores, at 1101, computed for a set of entrant forecasting models is provided in FIG. 11. Forecast accuracy scores 1105 are computed as a function of mean absolute scaled error of each entrant forecasting models 1103 from a set of entrant forecasting models in an election contest. In this case, an exponential smoothing state space forecasting model based on modelling Error, Trend and Seasonal (ETS) elements of a time series is considered to have the highest scores because it shows a smaller margin of error than the rest of the entrant forecasting models shown in FIG. 11. Thus, in this case, ETS would be selected for its implementations or deployments into a production environment.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Python™, Unix utilities, C, C++, C#, Java™, JavaScript, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The invention claimed is:

1. An apparatus, comprising:
a processor; and
a memory storing instructions which, when executed by the processor, cause the processor to:
detect one or more conditions associated with potential replacement of an incumbent forecasting model for a time series; and
adapt a time-series forecasting engine to more accurately forecast data points in the time series, wherein adapting the time-series forecast engine comprises:
receiving a dataset, from a plurality of data sources, the dataset includes a data content indicative of the time series with descriptive values associated with a feature of an entity;
determining a time series characteristic based on the data content;
selecting a set of entrant forecasting models from a plurality of forecasting models stored in the memory, based on the time series characteristic;
training each entrant forecasting model from the set of entrant forecasting models using the data content indicative of the time series to produce a set of trained entrant forecasting models;
instantiating, in the memory, a data structure with a set of forecasted values generated by at least one execution of each trained entrant forecasting model from the set of trained entrant forecasting models, the set of forecasted values indicating estimations of the descriptive values associated with the feature of the entity; and
selecting at least one forecasting model from the set of trained entrant forecasting models based on an accuracy evaluation of each forecast value from the set of forecasted values; and
replacing the incumbent forecasting model with the selected forecasting model, the accuracy evaluation of the selected forecasting model indicating a superior forecasting accuracy of the selected forecasting model over the incumbent forecasting model.

2. The apparatus of claim 1, wherein determining the time series characteristic includes:
executing an autocorrelation analysis over the data content; and
determining at least one seasonality on the time series by the identification of at least one data set from the data content satisfying a predetermined statistically significant autocorrelation condition, the at least one seasonality used, at least in part, to select the set of entrant forecasting models.

3. The apparatus of claim 1, wherein determining the time series characteristic includes:
executing a partial autocorrelation analysis over the data content; and
determining at least one seasonality of the time series by an identification of at least one data set from the data content satisfying a predetermined statistically significant partial autocorrelation condition, the at least one seasonality used, at least in part, to select the set of entrant forecasting models.

4. The apparatus of claim 1, wherein the data content indicative of the time series is a first data content, determining the time series characteristic includes:
extracting from the dataset a second data content;
determining an exogenous variable value based on the second data content;
selecting a lag time period from the time series based on the exogenous variable value;
executing an auto-correlation and/or a partial autocorrelation analysis over the selected lag time period from the time series; and
determining at least one seasonality of the time series by an identification of at least one data set from the first data content satisfying a predetermined statistically significant condition, the at least one seasonality used, at least in part, to select the set of entrant forecasting models.

5. The apparatus of claim 1, wherein determining the time series characteristic includes:
selecting, from the received dataset, a set of cross-sectional data associated with the feature of the entity; and
determining the time series characteristic based, at least in part, as a function of the cross-sectional data and the data content indicative of the time series.

6. The apparatus of claim 1, wherein determining the time series characteristic includes:
executing an extraction process over the received dataset to produce a set of metadata; and
determining the time series characteristic based, at least in part, as a function of the set of metadata and the data content indicative of the time series.

7. The apparatus of claim 1, wherein determining the time series characteristic includes determining the time series characteristic based on at least one of a) seasonality analysis; b) variability analysis; c) number of predictive variables; and d) shape distribution analysis.

8. The apparatus of claim 1, wherein training each entrant forecasting model includes:
dividing the data content indicative of the time series into a first set and a second set, the first set including time series data points sampled during at least one first period of time, the second set including time series data points sampled during at least one second period of time, the at least one first period of time being earlier than the at least one second period of time.

9. A method comprising:
detecting one or more conditions associated with potential replacement of at least one incumbent forecasting model for a time series, wherein the at least one incumbent forecasting model is implemented on a compute device operatively coupled to a processor, and wherein detecting the conditions includes executing, using the processor, a fitness evaluation of the at least one incumbent forecasting model; and
adapting a time-series forecasting engine to more accurately forecast data points in the time series, wherein adapting the time-series forecast engine comprises:
selecting, at least based on the fitness evaluation, a set of entrant forecasting models from a plurality of forecasting models stored in a memory operatively coupled to the processor;
instantiating, in the memory, a data structure with a set of forecasted values generated by an execution of each entrant forecasting model from the set of entrant forecasting models, the set of forecasted values indicates the time series with descriptive values of a feature associated with an entity feature; and replacing the at least one incumbent forecasting model with at least one elected forecasting model selected from the set of entrant forecasting models based on at least one forecast model measure, the at least one forecast model measure indicating a superior fitness and/or forecasting accuracy of the at least one elected forecasting model over the at least one incumbent forecasting model, the at least one forecast model measure including a coefficient of variation, wherein replacing the at least one incumbent forecasting model further includes:

calculating a coefficient of variation for each entrant forecasting model from the set of entrant forecasting models, based at least in part on the data structure with the set of forecasted values for that entrant forecasting model; and selecting the at least one elected forecasting model from the set of entrant forecasting models based on a comparison between the coefficient of variation of each entrant forecasting model from the set of entrant forecasting models and the coefficient of variation for each remaining entrant forecasting models from the set of entrant forecasting models.

10. The method of claim 9, wherein the executing the fitness evaluation includes executing, via the processor, the fitness evaluation upon a determination that a time-based condition has been met, the time-based condition coded in the memory.

11. The method of claim 9, wherein the executing the fitness evaluation includes executing, via the processor, the fitness evaluation upon a determination that a sample size condition has been met, the sample size condition associated with a predetermined training sample size threshold associated with at least one forecasting model from the plurality of forecasting models stored in the memory.

12. The method of claim 9, wherein the executing the fitness evaluation includes executing, via the processor, the fitness evaluation upon a determination that a time series condition has been met, the time series condition associated with a predetermined threshold of a time series time interval value of a training set associated with at least one forecasting model from the plurality of forecasting models stored in the memory.

13. The method of claim 9, wherein the at least one forecast model measure includes a Mean Absolute Error (MAE), the replacing the at least one incumbent forecasting model further includes:

calculating the MAE, for each entrant forecasting model from the set of entrant forecasting models, the MAE for each entrant forecasting model being computed based at least in part on the data structure with the set of forecasted values for that entrant forecasting model; and selecting the at least one elected forecasting model from the set of entrant forecasting models based on a comparison between the MAE of each entrant forecasting model from the set of entrant forecasting models and the MAE for each remaining entrant forecasting model from the set of entrant forecasting models.

14. The method of claim 9, wherein the at least one forecast model measure includes a Mean Absolute Percentage Error (MAPE), the replacing the at least one incumbent forecasting model further includes:

calculating the MAPE, for each entrant forecasting model from the set of entrant forecasting models, the MAPE for each entrant forecasting model being computed based at least in part on the data structure with the set of forecasted values for that entrant forecasting model; and selecting the at least one elected forecasting model from the set of entrant forecasting models based on a comparison between the MAPE of each entrant forecasting model from the set of entrant forecasting models and the MAPE for each remaining entrant forecasting model from the set of entrant forecasting models.

15. The method of claim 9, wherein the at least one forecast model measure includes a Mean Absolute Scaled Error (MASE), the replacing the at least one incumbent forecasting model further includes:

calculating the MASE, for each entrant forecasting model from the set of entrant forecasting models, the MASE for each entrant forecasting model being computed based at least in part on the data structure with the set of forecasted values for that entrant forecasting model; and selecting the at least one elected forecasting model from the set of entrant forecasting models based on a comparison between the as the MASE of each entrant forecasting model from the set of entrant forecasting models and the MASE for each remaining entrant forecasting model from the set of entrant forecasting models.

16. The method of claim 9, wherein the at least one forecast model measure includes a Root Mean Squared Error (RMSE), the replacing the at least one incumbent forecasting model further includes:

calculating the RMSE, for each entrant forecasting model from the set of entrant forecasting models, the RMSE for each entrant forecasting model being computed based at least in part on the data structure with the set of forecasted values for that entrant forecasting model; and selecting the at least one elected forecasting model from the set of entrant forecasting models based on a comparison between the RMSE of each entrant forecasting model from the set of entrant forecasting models and the RMSE for each remaining entrant forecasting model from the set of entrant forecasting models.

17. The method of claim 9, wherein the at least one forecast model measure includes a Normalized Root Mean Squared Error (NRMSE), the replacing the at least one incumbent forecasting model further includes:

calculating the NRMSE, for each entrant forecasting model from the set of entrant forecasting models, the NRMSE for each entrant forecasting model being computed based at least in part on the data structure with the set of forecasted values for that entrant forecasting model; and selecting the at least one elected forecasting model from the set of entrant forecasting models based on a comparison between the NRMSE of each entrant forecasting model from the set of entrant forecasting models and the NRMSE for each remaining entrant forecasting model from the set of entrant forecasting models.

18. The method of claim 9, wherein the at least one forecast model measure includes a Mean of Forecasted Values (MFV), the replacing the at least one incumbent forecasting model further includes:

calculating the MFV, for each entrant forecasting model from the set of entrant forecasting models, the MFV for each entrant forecasting model being computed based at least in part on the data structure with the set of forecasted values for that entrant forecasting model; and selecting the at least one elected forecasting model from the set of entrant forecasting models based on a comparison between the MFV of each entrant forecasting model from the set of entrant forecasting models and the MFV for each remaining entrant forecasting model from the set of entrant forecasting models.

19. The method of claim 9, wherein the at least one forecast model measure includes a Standard Deviation of Forecasted Values (SDFV), the replacing the at least one incumbent forecasting model further includes:

calculating the SDFV, for each entrant forecasting model from the set of entrant forecasting models, the SDFV for each entrant forecasting model being computed based at least in part on the data structure with the set of forecasted values for that entrant forecasting model; and selecting the at least one elected forecasting model from the set of entrant forecasting models based on a comparison between the SDFV of each entrant forecasting model from the set of entrant forecasting models and the SDFV for each remaining entrant forecasting model from the set of entrant forecasting models.

20. The method of claim 9, wherein the at least one forecast model measure includes an information criterion, the replacing the at least one incumbent forecasting model further includes:

calculating the information criterion, for each entrant forecasting model from the set of entrant forecasting models, the information criterion for each entrant forecasting model being computed based at least in part on the data structure with the set of forecasted values for that entrant forecasting model; and selecting the at least one elected forecasting model from the set of entrant forecasting models based on a comparison between the information criterion of each entrant forecasting model from the set of entrant forecasting models and the information criterion for each remaining entrant forecasting model from the set of entrant forecasting models.

21. The method of claim 9, wherein the at least one forecast model measure includes a quality measure based on an Akaike information criterion, the replacing the at least one incumbent forecasting model further includes:

calculating the quality measure based on the Akaike information criterion, for each entrant forecasting model from the set of entrant forecasting models, the quality measure for each entrant forecasting model being computed based at least in part on the data structure with the set of forecasted values for that entrant forecasting model; and selecting the at least one elected forecasting model from the set of entrant forecasting models based on a comparison between the quality measure of each entrant forecasting model from the set of entrant forecasting models and the quality measure for each remaining entrant forecasting model from the set of entrant forecasting models.

22. The method of claim 9, wherein the at least one forecast model measure includes a quality measure based on a Bayesian Information Criterion CBIC), the replacing the at least one incumbent forecasting model further includes:

calculating the quality measure based on the BIC, for each entrant forecasting model from the set of entrant forecasting models, the quality measure for each entrant forecasting model being computed based at least in part on the data structure with the set of forecasted values for that entrant forecasting model; and selecting the at least one elected forecasting model from the set of entrant forecasting models based on a comparison between the quality measure of each entrant forecasting model from the set of entrant forecasting models and the quality measure for each remaining entrant forecasting model from the set of entrant forecasting models.

23. The method of claim 9, wherein the at least one forecast model measure includes a function of one or more of a) a mean absolute error (MAE); b) a mean absolute percentage error (MAPE); c) a mean absolute scaled error (MASE); d) a root mean squared error (RMSE); e) a normalized root mean square error (NRMSE); f) a coefficient of variation (CV); g) a mean of forecasted values (MFV); h) a standard deviation of forecasted values (SFV); i) an Akaike information criterion (AIC); and j) a Bayesian information criterion (BIC).

24. The method of claim 9, further comprising:

receiving, at the compute device, a dataset from a plurality of data sources, the dataset includes a data content indicative of a time series with descriptive values associated with a feature of an entity;

training, via the processor, the plurality of forecasting models using the dataset as a training dataset to produce a set of trained forecasting models;

calculating a set of fitness measures including a fitness value for each forecasting model from the set of trained forecasting models; and selecting at least one forecasting model from the set of trained forecasting models as the at least one incumbent forecasting model based on the set of fitness measures.

25. A non-transitory computer-readable medium comprising code which, when executed by a processor, causes the processor to:

detect one or more conditions associated with potential replacement of an incumbent forecasting model for a time series; and adapt a time-series forecasting engine to more accurately forecast data points in the time series, wherein adapting the time-series forecast engine comprises:

receiving a sample dataset with a data content indicative of a time series with descriptive values associated with a feature of an entity;

determining a time series characteristic based on the data content;

instantiating using the processor, a set of entrant forecasting models selected from a plurality of forecasting models coded in the non-transitory computer-readable medium, the set of entrant forecasting models selected based on the time series characteristic;

training the set of entrant forecasting models with data content included in the dataset to produce a set of trained entrant forecasting models;

calculating a set of fitness values that includes at least one fitness measurement value for each trained entrant forecasting model from the set of trained entrant forecasting models, the at least one fitness measurement value for each trained entrant forecasting model including a coefficient of variation, the coefficient of variation for each trained entrant forecasting model being computed at least in part based on a set of forecasted values generated by an execution of that trained entrant forecasting model;

selecting a trained entrant forecasting model from the set of trained entrant forecasting models as an elected forecasting model, based on a comparison between the coefficient of variation of each entrant forecasting model from the set of entrant forecasting models and the coefficient of variation for each remaining entrant forecasting models from the set of entrant forecasting models; and replacing the incumbent forecasting model with the selected forecasting model, the accuracy evaluation of the selected forecasting model indicating a superior forecasting accuracy of the selected forecasting model over the incumbent forecasting model, wherein replacing the incumbent forecasting model with the selected forecasting model comprises executing the elected forecasting model to receive datasets, from a plurality of monitored data sources, the datasets include data content indicative of time series with descriptive values associated with the feature of the entity.

26. The non-transitory computer-readable medium of claim 25, wherein the elected forecasting model is a first elected forecasting model, and wherein execution of the code further causes the processor to:

execute, at predetermined intervals of time, a comparison of forecasted values generated by the elected forecasting model against datasets received from the plurality of monitored data sources coupled to the processor;

calculate a fitness value for the first elected forecasting model based on the comparison; and select a second elected forecasting model from the plurality of forecasting models coded in the non-transitory computer-readable medium upon a determination that the fitness value for the first elected forecasting model has reached a predetermined threshold.

27. The non-transitory computer-readable medium of claim 25, wherein the elected forecasting model is a first elected forecasting model, and wherein execution of the code further causes the processor to:

execute, at predetermined intervals of time, a comparison of forecasted values generated by the elected forecasting model against datasets received from the plurality of monitored data sources coupled to the processor;

calculate a fitness value for the first elected forecasting model based on the comparison; and select a second elected forecasting model from the set of entrant forecasting models upon a determination that the fitness value for the first elected forecasting model has reached a predetermined threshold indicative of a loss of fitness and/or forecasting accuracy.

28. The non-transitory computer-readable medium of claim 25, wherein the plurality of forecasting models includes at least one of a) Markov chain Monte Carlo models; b) autoregressive models; c) exponential smoothing models; d) non-linear regression models; e) non-parametric regression models; f) linear regression models; and f) shrinkage models.

29. The non-transitory computer-readable medium of claim 25, wherein the plurality of forecasting models includes univariate time series forecasting models and multivariate time series forecasting models.

* * * * *